US012234160B2

(12) United States Patent
Russell

(10) Patent No.: US 12,234,160 B2
(45) Date of Patent: *Feb. 25, 2025

(54) CATALYTIC SIEVES AND METHODS FOR MAKING SAME

(71) Applicant: RJSK, LLC, Spokane, WA (US)

(72) Inventor: Matthew F. Russell, Spokane, WA (US)

(73) Assignee: RJSK, LLC

( * ) Notice: Subject to any disclaimer, the term of this patent is extended or adjusted under 35 U.S.C. 154(b) by 747 days.

This patent is subject to a terminal disclaimer.

(21) Appl. No.: 17/300,609

(22) Filed: Sep. 3, 2021

(65) Prior Publication Data

US 2021/0403342 A1     Dec. 30, 2021

Related U.S. Application Data

(63) Continuation-in-part of application No. 16/602,641, filed on Nov. 13, 2019, now Pat. No. 11,111,157.
(Continued)

(51) Int. Cl.
*C02F 1/00*      (2023.01)
*B01D 39/06*     (2006.01)
(Continued)

(52) U.S. Cl.
CPC ............. *C02F 1/001* (2013.01); *B01D 39/06* (2013.01); *B01J 20/12* (2013.01); *B01J 20/3078* (2013.01);
(Continued)

(58) Field of Classification Search
CPC ........ C02F 1/001; B01J 20/12; B01J 20/3078; C04B 14/005
See application file for complete search history.

(56) References Cited

U.S. PATENT DOCUMENTS 1,851,363 A * 3/1932 Jaeger ..................... C07B 35/04
                                                        423/245.3
3,396,217 A * 8/1968 Foster ................. C04B 35/6303
                                                         264/434
(Continued)

FOREIGN PATENT DOCUMENTS

WO    WO-2011064186 A1 * 6/2011 ......... B01D 53/9418

*Primary Examiner* — Liam J Heincer
*Assistant Examiner* — M. Reza Asdjodi
(74) *Attorney, Agent, or Firm* — Reidlaw, L.L.C.; John S. Reid

(57) ABSTRACT

A method of manufacturing a catalytic sieve includes providing starting materials of an aggregate, a cementing agent, a sublimation agent and water. The sublimation agent (between 25% and 50% by weight of the cementing agent) is selected from molybdenum disulfide, tungsten disulfide, vanadium disulfide, copper sulfate, and combinations thereof. The aggregate contains at least 2% by weight of at least one transition metal. The method includes mixing the starting materials to achieve a mixture, placing the mixture into a form, and curing the mixture in the form to allow the mixture to become a solidified unit defined by a minimum dimension of thickness, length, width or diameter. The method further includes placing the solidified unit into a kiln, heating the kiln to 1115°-1350° C., maintaining the kiln at the temperature for between 10-60 minutes per centimeter of the minimum dimension, and removing the solidified unit from the kiln.

17 Claims, 8 Drawing Sheets

Related U.S. Application Data which is a continuation-in-part of application No. 15/999,944, filed on Aug. 30, 2018, now Pat. No. 10,486,984, which is a continuation of application No. 14/756,884, filed on Oct. 26, 2015, now Pat. No. 10,106,463.

(51) Int. Cl.
*B01J 20/12* (2006.01)
*B01J 20/30* (2006.01)
*C04B 14/00* (2006.01)
*E01C 3/06* (2006.01)
*E01C 11/22* (2006.01)
*E03F 1/00* (2006.01)
*E03F 5/04* (2006.01)
*C02F 103/00* (2006.01)
*E01C 11/24* (2006.01)

(52) U.S. Cl.
CPC ............. *C04B 14/005* (2013.01); *E01C 3/06* (2013.01); *E01C 11/225* (2013.01); *E01C 11/228* (2013.01); *E01C 11/229* (2013.01); *E03F 1/002* (2013.01); *E03F 5/0404* (2013.01); *B01D 2239/1241* (2013.01); *C02F 2103/001* (2013.01); *E01C 11/24* (2013.01)

(56) References Cited

U.S. PATENT DOCUMENTS

| | | | | |
|---|---|---|---|---|
| 5,358,049 | A | * | 10/1994 | Hale ........................ C09K 8/46 507/140 |
| 2008/0185463 | A1 | * | 8/2008 | Schlesinger ............. C09D 7/68 241/97 |
| 2010/0310440 | A1 | * | 12/2010 | Bull ....................... B01J 20/186 423/239.1 |
| 2012/0134916 | A1 | * | 5/2012 | Fedeyko .............. B01J 37/0246 423/239.2 |
| 2014/0314990 | A1 | * | 10/2014 | Henn .................... C04B 14/043 501/153 |
| 2015/0018195 | A1 | * | 1/2015 | Van Aubel .............. C04B 33/32 264/43 |
| 2017/0113169 | A1 | * | 4/2017 | Russell .................. B28B 11/247 |
| 2017/0113973 | A1 | * | 4/2017 | Russell .................. E03F 5/0404 |
| 2020/0087165 | A1 | * | 3/2020 | Russell ................... C02F 1/001 |
| 2021/0403342 | A1 | * | 12/2021 | Russell .............. C04B 38/0605 |
| 2023/0133285 | A1 | * | 5/2023 | Russell .............. C04B 40/0089 106/643 |
| 2023/0139550 | A1 | * | 5/2023 | Russell .................... C04B 7/22 106/705 |

* cited by examiner ated construction material, and including hole-forming metal bar material used to form holes for installation of post-kilning reinforcing bar material.

CATALYTIC SIEVES AND METHODS FOR MAKING SAME

CROSS-REFERENCE TO RELATED APPLICATIONS

This U.S. patent application is a continuation-in-part of U.S. patent application Ser. No. 16/602,641, filed on Nov. 13, 2019 (and set to issue as U.S. Pat. No. 11,111,157 on Sep. 7, 2021), which is in turn a continuation-in-part of U.S. patent application Ser. No. 15/999,944, filed on Aug. 30, 2018 (issued to patent on Nov. 26, 2019 as U.S. Pat. No. 10,486,984), which is in turn a continuation of U.S. patent application Ser. No. 14/756,884, filed on Oct. 26, 2015 (now U.S. Pat. No. 10,106,463 B2, issued Oct. 23, 2018), all of which are hereby incorporated by reference herein in their entirety.

BACKGROUND

In certain instances it is desirable that rainwater and the like drain quickly from a surface area covered by paving tiles. In certain uses it is desirable that the water quickly drain through the pavers (in which case a high permeability is desired). In other instances it is desirable that the water be retained within the pavers and slowly released through drainage and/or evaporation. One example where this latter feature is desirable is in managing storm water. In this instance it can be further advantageous that the pavers provide a filtering function to remove particulate matter and other pollutants from the storm water. Since storm water typically is routed to sewer systems via storm drains, storm water and pollutants contained therein can place a significant burden on sewage treatment facilities. It is thus desirable to reduce the volume of storm water flowing into storm drains, and also to remove contaminates from the storm water before it enters the storm drains. It is further desirable that filler material (such as sand and gravel) beneath and between pavers and the like also be able to retain a large volume of water and release the water slowly. In addition to filtering storm water, it is also desirable to provide a durable porous material that can be used to filter air and other liquid and gas flows.

It is also desirable to be able to form unitized building materials (as for example, bricks, pavers, beams, unitized slabs and other building materials) having high strength, but that do not require significant amounts of cement in their formation. That is, it is desirable to reduce the amount of cement required in forming such unitized building materials. At least in the U.S., the Portland cement manufacturing industry is becoming increasingly regulated (e.g., by the U.S. Environmental Protection Agency at the U.S. Federal level) to reduce emissions of toxic air pollutants, such as mercury, acid gases, carbon dioxide, and total hydrocarbons, along with emissions of particulate matter, which are typically generated during the manufacture of cement.

It is additionally desirable to provide an alternative to clay-based bricks which combine structural and architectural elements, and which can be kilned in a time period shorter than the typical clay-based brick kilning period (commonly about 24-48 hours), thus reducing energy consumption and environmental pollutants (such as carbon dioxide) frequently associated with energy generation.

It is further desirable to provide unitized building materials, and in particular, such materials used in walkways and roadways, that are chemically resistant to ice melting chemicals and other materials that may be applied atop of the unitized building materials. Still further, in certain applications it is desirable that unitized building materials be light weight, yet still retain the strength required for their intended use. It is also desirable to achieve higher strengths (compressive and/or tensile) in unitized building materials, as well as increased resistance to stresses imposed by freezing and thawing of water that can be entrained within the unitized building materials.

DETAILED DESCRIPTION

Figure 1:
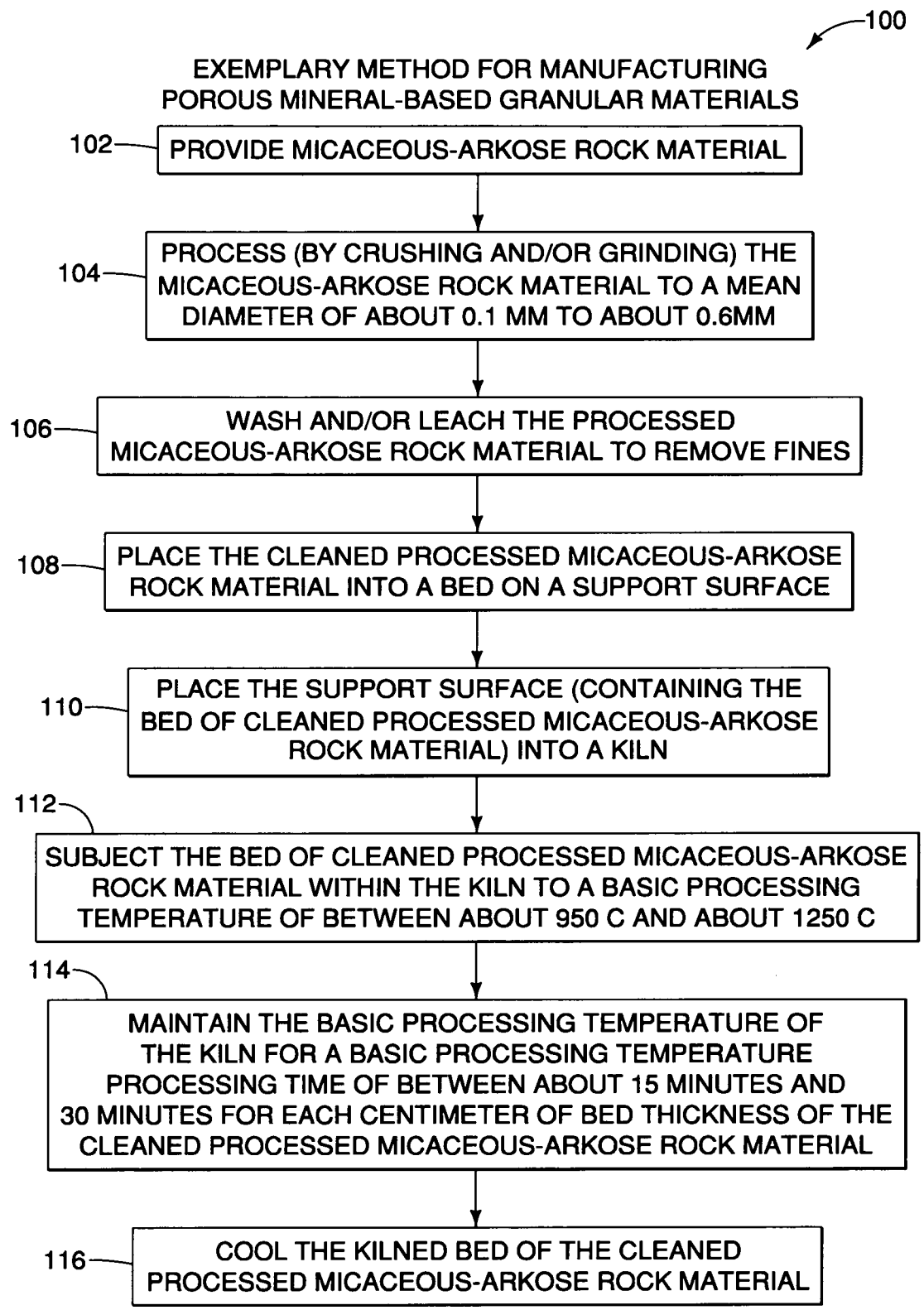
FIG. 1 is a flowchart of an exemplary method for manufacturing a porous mineral-based granular material, according to the present disclosure.

The following disclosure provides (without limitation) my discovery of methods for manufacturing mineral-based porous granular materials, as well as such manufactured mineral-based porous granular materials. The mineral-based porous granular materials provided for herein can be used as subgrade fill material, as a soil additive, as a filter material, and can also be used in the manufacture of unitized building materials (among other uses not specifically described). The following disclosure also provides (without limitation) for methods for manufacturing mineral-based unitized building materials (as well as for the mineral-based unitized building materials themselves) that reduce the quantity of cement required over current methods for manufacturing mineral-based unitized building materials. The mineral-based unitized building materials provided for herein can be engineered (as provided for below) to accommodate at least desired properties of porosity, permeability, chemical resistance, air entrainment, strength and density. Further, by the selective addition of metals to the mineral-based unitized materials, the materials can be used as catalytic sieves for promoting chemical reactions.

The following disclosures are generally directed towards mineral-based porous granular materials and mineral-based unitized building materials, while allowing for certain variations. The term "mineral-based" is used herein to refer to base materials that are composed of more than fifty percent by weight (50 weight %) of elements having atomic numbers greater than 10 (an atomic number of 10 being associated with the element neon, and an atomic number of 11 being associated with the element sodium). That is, mineral-based materials (as the term is used herein) exclude hydrocarbon-based materials (i.e., materials that are composed of more than fifty percent by weight (50 weight %) of elements having atomic numbers of less than 11, and specifically materials principally composed of carbon, hydrogen and oxygen.

As a general rule, when hydrocarbon-based materials are subjected to temperatures in excess of about 650° C. (about 1200° F.) the hydrocarbon-based materials tend to either vaporize or fuse into a consolidated block having low porosity and low permeability. (Any porosity of hydrocarbon-based materials subjected to a temperature in excess of about 650° C. is largely in the range of about 5 microns or greater as the result of the inclusion of gaseous bubbles, accompanied by low permeability.) By comparison I have discovered that when mineral-based materials are subjected to temperatures in excess of about 650° C. (about 1200° F.) they tend to form porous materials due to the evolution (including sublimation and/or vaporization) of chemical compounds from the initial mineral-based materials.

The following disclosure will be generally discussed in two parts: (i) methods for manufacturing mineral-based granular materials (including mineral-based porous granular materials); and (ii) methods for manufacturing mineral-based unitized building materials (including mineral-based porous unitized building materials, and especially fluid-permeable mineral-based unitized building materials).

Mineral-Based Porous Granular Materials.

In the following discussion I will, from time-to-time, refer to the granular materials (both starting materials and finished materials) as being associated with a particular grade of sand. Different grades of sand are defined by recognized standards, such as the by the American Association of State Highway and Transportation Officials ("AASHTO"), the American Society for Testing Materials ("ASTM"), and the International Organization for Standardization ("ISO"). Specifically, AASHTO M 145, ASTM D3282, and ISO 14688 provide for the definitions of different grades of sand. More specifically, the following grades of sand may be referred to herein: (i) fine sand, being between 0.063 mm and 0.2 mm per ISO 14688, and between 0.125 mm and 0.250 mm per AASHTO M 145; (ii) medium sand, being between 0.2 mm and 0.63 mm per ISO 14688, and being between 0.250 mm and 0.50 mm per AASHTO M 145; and (iii) course sand, being between 0.63 mm and 2.0 mm per ISO 14688, and being between 0.50 mm and 1.0 mm per AASHTO M 145. (AASHTO M 145 further defines very coarse sand as being between 1.0 and 2.0 mm.) It will be appreciated that the sizes referenced are mean diameters, and are measured by passing the sand material through a first sieve to separate particles smaller than the lower end of the size range, and then passing the remaining materials through a second sieve to separate particles greater than the higher end of the size range. The remaining particles thus essentially fall within the size range designated for the grade of sand (or sand grade). As can be appreciated, there is some overlap in the above definitions of sand grades (e.g., between ISO 14688 and AASHTO M 145). Accordingly, in the following discussion I will use the following terms for grades of sand: (i) fine sand will mean a mineral-based particle having a mean diameter of between about 0.060 mm and about 0.250 mm; (ii) medium sand will mean a mineral-based particle having a mean diameter of between about 0.20 mm and about 0.65 mm; and (iii) coarse sand will mean a mineral-based particle having a mean diameter of between about 0.50 mm and about 1.0 mm (unless specifically indicated otherwise). (Very coarse sand will mean a mineral-based particle having a mean diameter of between about 1.0 mm and about 2.0 mm, and gravel will mean a mineral-based particle having a mean diameter of greater than about 2.0 mm.) It will be appreciated that the just-described grades of sand include some overlap between the upper and lower mean particle diameters between grades. For example, the upper end range for fine sand (i.e., 0.250 mm) overlaps the lower end range for medium sand (i.e., 0.20 mm) by 0.050 mm, and the upper end range for medium sand (i.e., 0.65 mm) overlaps the lower end range for coarse sand (i.e., 0.50 mm) by 0.15 mm. These overlaps in particle sizes will not constitute more than about 25% of the total material (between sand grades), and will not affect the overall process for forming the porous granular materials, and the unitized formed construction materials, as provided for herein.

It will be further appreciated that the term sand, as used herein, is used to refer to a mineral-based particle (as described above), and is not to be constrained in any way by other extrinsic definitions of sand. In particular, the term sand, as used herein, does not mean that the material is primarily quartz-based. That is, the term sand, as used here, is meant to refer to mineral-based particles having the gradations described above.

Materials that can be Used in Formulating the Mineral-Based Porous Granular Materials.

Materials that can be used to manufacture the mineral-based porous granular materials provided for herein include arkose. Arkose is a sedimentary rock formed from the remains of other rocks, and more specifically a type of sandstone containing at least 25% feldspar. (Feldspar is the name given to a group of minerals distinguished by the presence of alkali, alumina and silica ($SiO_2$) in their chemistry. This group includes aluminum silicates of soda, potassium, or lime.) More specifically, materials that can be used to manufacture the mineral-based granular materials provided for herein include arkose material from the Precambrian series of ultrafine clastic nature (i.e., made up of fragments of preexisting rock), preferably having a homogeneous nature. Such materials can be obtained from the Burke formation and the St. Regis formation (both of which can be found in western Montana, United States). In a first example the arkose is preferably about 50% felsic (i.e., minerals including feldspar, feldspathoids, white mica (such as muscovite and sericite) or golden mica (such as sodic paragonite)), 35% quartz, and 15% volatile components (i.e., components which will sublimate and/or vaporize when subjected to temperatures in excess of about 950° C.). The volatile components can include low-iron metal sulfides such as, for example, zinc sulfide (ZnS) and low-iron metal disulfides such as molybdenum disulfide ($MoS_2$). The felsic component is preferably provided by using a micaceous rock material which provides a precursor to the felsic component when heated (as discussed below), thus generating the desirable felsic components such as sodic feldspar (e.g., $NaAlSi_3O_8$, $NaAl_2[(OH)_2|AlSi_3O_{10}]$) and/or potassic feldspar (e.g., $KAlSi_3O_8$). (Other materials that can be used which provide the desirable felsic component precursors include sericitized rhyolites and sericitized granites.) This material selection is preferable in forming the desired porosity of the granular particles, and in forming unitized construction materials therefrom (as described below), for the following reasons:

(1) A low-quartzitic (i.e., less than about 35% quartz) felsic material allows for a relatively low sintering temperature (of about 1900-2150° F., or about 1040-1180° C.) in order to fuse the particles to one another, versus a more quartrzitic-based material (i.e., a material having more than about 35% quartz), which requires a higher temperature range (e.g., about 2000-2500° F., or about 1090-1370° C.) in order to achieve sintering.

(2) A sodic and/or potassic felsic material is more resistant to chemical attack (i.e., chemical decomposition) as compared to a felsic calcium silicate (e.g., $CaAl_2Si_2O_8$) and/or a felsic magnesium silicate (e.g., $MgAl_2Si_2O_6$), such as can occur when the material is subjected to components such as ice melters and the like.

(3) The quantity of quartz (i.e., less than about 35%) allows for a solid framework that affords the solid portion of a liquid-solid sintering basis to occur when heated to the desired processing temperature of between about 1065-1150° C. (about 1950-2100° F.), at which temperature the feldspar portion of the material becomes flowable (i.e., liquid and/or plastic).

(4) The volatile component portion of the material, through sublimation and/or vaporization of a portion of the lattice adjacent to the felsic and quartz units of the material, allows for the maintenance of porosity of the particles if the particles are to be later sintered to one another (e.g., at a temperature which allows for sintering of the particles to one another in order to form a unitized building material).

Another material that can be used to manufacture the mineral-based porous granular materials provided for herein is sericitized igneous rock such as rhyolite (which typically includes more than 69% $SiO_2$). Rhyolite can also include molybdenum disulfide in rhyolitic porphyrites, such that a mica/feldspar component in the rock is with the molybdenum disulfide.

In addition to using feldspathic arkose and sericitized igneous rock such as rhyolite, the mineral-based porous granular materials provided for herein can be manufactured using arkosic quartzite, and more preferably micaceous quartzite or micaceous arkosic felsite. Preferably, the mica within the arkose is muscovite or paragonite. Muscovite is a phyllosilicate mineral including aluminum and potassium with the formula $KAl_2(AlSi_3O_{10})(F,OH)_2$, or $(KF)_2(Al_2O_3)(SiO_2)_6(H_2O)$. Paragonite is a mica mineral having the empirical formula $NaAl_2[(OH)_2|AlSi_3O_{10}]$. More preferably the mica component in the arkose has a low iron content (e.g., 3% or less), or no iron, and more than about 4% potassium content in the case of muscovite, and more than about 4% sodium in the case of paragonite. In one example, the micaceous arkose had about 6% potassium. Still more preferably, the mica component in the arkose is small-grained (for example, between about $10^{-3}$ meter and $10^{-5}$ meter in diameter, and preferably with an average order of magnitude of $10^{-4}$ meter in diameter), and evenly distributed within the arkose. The micaceous arkose should preferably contain more than 20% by weight of mica, and preferably at least about 40% mica. More preferably the micaceous arkose should have a ground mass of between 30% and 70% of the overall starting material. One example of a source for such micaceous arkose is the middle and lower Burke formation in western Montana, United States. The mica content in the micaceous arkose from the Burke formation has about 40-60% mica content. When the micaceous arkose is heated to the processing temperature (described more fully below) the reaction is muscovite+quartz→K-feldspar+aluminum silicate+steam, or paragonite+quartz→sodic feldspar+aluminum silicate+steam. Aluminum silicate forms as a fibrous material. It is believed that the formation of the aluminum silicate, and the vaporization of the water, result in the desirable porous properties of the resulting K-feldspar.

In another example the starting material includes at least 70% by weight of a micaceous arkose rock material, and at least about 50% by volume of the starting material has a mean diameter of between about 0.060 mm and about 0.65 mm. In this example kilning of the starting material (at a temperature of between about 1100° C. and about 1300° C.) transforms at least 40% (by volume) of micaceous components in the micaceous arkose rock material into feldspar which contains metal sulfides, and evolves at least 30 percent (by volume) of the metal sulfides within the feldspar from the feldspar as metallic oxides. In this example the starting material includes between about 10% and 40% by weight of quartz, and between about 20% and 40% by weight of metallic compounds which are reacted to form the metal sulfides. Further in this example, the feldspar is at least about 80% or more (by weight) of a sodic material, a potassic felsic material, or a combination thereof.

In addition to using naturally-occurring materials (as described above), the starting material to manufacture the mineral-based granular porous materials of the present disclosure can include manufactured engineered mineral-based materials which are prepared (e.g., by means such as crushing and/or grinding) to put them into the desired size (i.e., mean diameter) for further processing. For example, primarily muscovite or sericite rock can be ground to a fine grain size and mixed with ground fine grained quartz.

In one variation the starting materials for the formation of the porous mineral-based granular material preferably contain at least about 5% (by weight), and more preferably at least about 25% (by weight), of a volatile component such that when the starting materials are subjected to a temperature of between about 950-1200° C. (about 1750-2200° F.), the volatile components of the starting materials will sublime and/or vaporize from the surfaces of the starting materials, thus creating, in addition to the mica-to-feldspar reaction described below, the desired porosity. The volatile components exclude components which are liquid at or below about 200° C. (such as liquid water), and are mineral components which are chemically bonded to the surfaces (as well as to the inner matrix) of the granules of the starting material. Examples of such volatile components include (without limitation), metal sulfides (such as, by way of example, zinc-sulfide, iron sulfide, copper sulfide and molybdenum disulfide). (When the starting materials are manufactured using mineral-based materials, the percentage of volatile components will typically be lower, such as about 20% or less, by weight.) Further, subjecting the starting materials to this temperature range (i.e., between about 950° and 1200° C.) may cause some of the starting materials to sinter to one another, although this is not a requirement for the process. In the event that sintering of the starting materials does occur (due to the composition of the starting materials), then the resulting product can be crushed (if desired) in order to achieve the desired sand (or gravel) grade for post-processing or use of the resultant product (porous mineral-based granular material). This phenomenon of evolving metal sulfides in order to create porosity on (and within) the grains of the starting materials is more prevalent when the starting materials contain a high percentage of feldspar and/or mica. When the starting materials contain a high percentage of micaceous material, then the process can include generating porosity by conversion (under heat during the kilning process) of the micaceous components to felsic components, and then subsequent evolution of metal sulfides in these felsic components into evolved volatile components. The starting materials can be derived from primarily micaceous arkosic rock, from primarily felsic arkosic rock, from a rock containing at least some micaceous content, from a rock containing at least some feldspar content, and from combinations thereof.

The process (method) for manufacturing the porous mineral-based granular materials provided for herein is generally performed as follows: (i) a starting material (as described above) is provided as a loose (i.e., non-consolidated) granular material, preferably of a fine to medium sand grade (as described above); (ii) the starting material is placed as a bed within a kiln; (ii) the kiln is heated to a temperature selected to evolve micaceous components into feldspathic components, and/or to evolve volatile mineral components from the granular starting materials; (iii) the starting material is maintained in the heated kiln for a period of time selected to evolve about 50% or more of the micaceous components and/or the volatile mineral materials from the granular starting materials; and (iv) the processed starting materials are then removed from the kiln. The materials removed from the kiln can then be used directly, or post-processed, as described more fully below. The process (for manufacturing the porous mineral-based granular materials provided for herein) is preferably performed as a batch process, although it can also be performed as a continuous process by placing the starting materials on a conveyor which moves through the kiln.

Bed thickness of starting materials. The thickness (i.e., depth) of the bed of starting materials is selected to preferably achieved evolution (i.e., sublimation and/or vaporization) of at least about 50% of the volatile mineral components located on the surfaces, and/or in the lattice of minerals such as mica and feldspar, of the granular starting materials, without causing an undesirable degree of fusing (i.e., sintering) of the starting material granules to one another, and while also providing for efficiency of material throughput. That is, a thin bed (e.g., a 1 inch (2.5 cm) deep bed) of starting material can be used, but while this thin bed thickness has been found to achieve the desired results (in the way of evolving the volatile mineral components located on the surfaces of the granular starting materials), it reduces the volume of material that can be successfully processed over time. On the other hand, a thick bed (e.g., a 5 inch deep bed) of starting material can be used, but while this bed thickness has been found to achieve the desired results (in the way of evolving the volatile mineral components located on the surfaces of the granular starting materials), it requires additional time, and further results in an undesirable degree of fusion (sintering) of the starting materials at the outer surfaces (upper and lower surfaces) of the bed. I have determined that, for the starting materials described above, a starting material bed thickness of less than about 3 inches (and preferably about 2.25-2.75 inches—i.e., about 5.7-7 cm) achieved a desired degree of evolution of the volatile mineral components located on the surfaces, and/or within the mineral lattices, of the granular starting materials (in order to achieve the desired degree of porosity for the resultant product of a mineral-based porous granular material), while also providing for a desirable processing time and avoiding an unacceptable level of sintering of the starting materials. Further, the desired bed thickness of the starting materials can vary based on the starting materials. To this end, a preferred starting-material bed thickness (bed depth) can be determined by performing bed thickness trial tests, using different bed thicknesses (for the same starting material) and then analyzing the resulting product for (primarily) porosity. (Such can be determined by examining samples of the resultant product under a microscope, including a electron-scanning microscope, to determine the degree of surface porosity achieved by using the selected bed depth, temperature range (as described below), and processing time (also as described below).)

Processing temperature and temperature regimen. Preferably, when the bed of starting materials is placed into the kiln, the kiln is at an initial temperature of less than about 260° C. (about 500° F.) in order to allow components (such as water) to evolve from the starting materials, thus reducing the likelihood of subsequent chemical reactions between the evolving mineral volatile elements and water vapor. For example, prior to increasing the kiln from the starting temperature to the basic processing temperature, the kiln can held at the starting temperature for a period of between about 20 minutes and 30 minutes per centimeter of bed thickness. This initial temperature is preferably maintained for a period of about 20 minutes per centimeter of depth of the bed of starting material. Afterwards the kiln temperature can be increased to the range of the basic processing temperature, which can be defined by a maximum desired temperature. The basic processing temperature is a temperature range selected to achieve evolution one or more of: (i) evolution (via chemical transformation) of at least about 50% of the micaceous components into felsic components; and/or (ii) evolution (via sublimation and/or vaporization) of at least about 50% of the volatile mineral components in the granular starting materials. Further, the temperature range is selected to avoid an undesirable degree of fusing (i.e., sintering) of the starting material granules to one another. In general, a basic processing temperature range of between about 950° and 1200° C. (about 1750-2200° F.), and more preferably, a basic processing temperature range of between about 1100° and 1200° C. (about 2000-2200° F.), has been determined to achieve the desired results for selected felsic arkose-based starting materials, and between about 950° and 1000° C. (about 1750-2000° F.) for selected micaceous arkose-based starting materials, although this temperature range can vary based on the starting materials and other variables. (The basic processing temperature is the mean temperature at which the starting materials are held for a selected time in order to achieve the desired level of evolution of the volatile mineral components from the surfaces of the starting materials.) Further, the desired basic processing temperature is primarily based on the starting materials—i.e., the temperature that will result in the desired level of evolution of the volatile mineral components from the surfaces, and/or within the lattices, of the selected starting materials. The time period for increasing the kiln temperature between the starting temperature [e.g., about 250° C.] and the desired basic processing temperature [e.g., about 950° C.] can be about 15 minutes per inch of starting-material bed depth. For example, for a bed depth of starting material of about 3 inches, the temperature can be increased from a starting temperature of about 250° C. to a basic processing temperature of about 950° C. over a period of time of about 30 minutes (i.e., about a 700° C. temperature increase over 30 minutes, or a kiln temperature increase from the starting temperature to the desired basic processing temperature of about 23° C. per minute). This rate of kiln temperature increase can be held as a constant (regardless of the depth of the starting material), or can be increased (or decreased) as a function of starting material bed depth. (E.g., for a starting material bed depth of about 1 inch, the kiln-ramp-up temperature can be about 100° C. per minute, i.e., about three times the rate for a starting material bed depth of about 3 inches.)

Processing time. The starting materials are preferably held at the desired basic processing temperature (typically, the maximum processing temperature) for a period of time (that is, the basic processing temperature processing time) which preferably evolves at least about 50% of the volatile mineral components located on the surfaces, and/or within the lattices, of the granular starting materials from the starting materials. The basic processing temperature processing time does not include time required to achieve the basic processing temperature within the kiln, but is rather the time that the starting materials are held within the kiln at or about the basic processing temperature. Preferably the basic processing temperature processing time is maintained for between about 15 minutes and 45 minutes for each centimeter of bed thickness of the starting materials. In one example, the basic processing temperature processing time is about 1 hour per inch (about 2.5 cm) of bed depth (i.e., thickness) of starting material.

Example: In one example, a starting material was prepared from an essentially micaceous arkosic rock which was initially prepared (i.e., crushed and/or ground) to a mean diameter of about 0.25 mm (with about 20% or less of the starting material being greater than about 0.30 mm in diameter, and about 20% or less of the starting material being less than about 0.20 mm in diameter). In this example, at least about 60% of the starting material had a mean particle diameter of between about 0.20 mm and 0.3 mm. The starting material was formed on a bed having a thickness (i.e., depth) of about 3 inches (about 7.6 cm), and was placed in a kiln at an initial temperature of about 200° C. The kiln was then heated to a temperature of about 1200° C. over a period of time of about 1.5 hours, and then held at a basic processing temperature of between about 1150-1225° C. (about 2100-2250° F.), for a period of time of about 3 (three) hours. Afterwards the kilned starting materials were cooled within the kiln to ambient temperature (without any temperature control over the cooling). It will be appreciated that the kilned starting materials can be cooled at controlled rates (e.g., slower or quicker rates than are achieved by subjecting the kilned materials to ambient temperature), and the cooling can be performed in a separate cooling chamber. For example, the kilned materials can be quenched by subjecting them to a rapid cooling regimen, or they can be annealed by subjecting them to a slower cooling regimen. Quenching can also be used to facilitate fracturing of any sintered materials, thus making it easier to crush any sintered material to a desired size.

Processing variables. As indicated above, the methods provided for herein for manufacturing a mineral-based porous granular material include the following process variables: (i) starting materials; (ii) bed thickness (i.e., bed depth) of the starting materials when introduced to the kiln; (iii) initial and desired basic processing temperature of the starting materials within the kiln; (iv) temperature ramp-up rate within the kiln from the initial temperature to the desired basic processing temperature; (v) the desired basic processing temperature; (vi) the time to hold the starting materials at the desired basic processing temperature within the kiln; and (vii) a cooling process of the product from the kiln. The objective is to produce a mineral-based granular material having a high porosity, but with small pore size. To this end, I have determined that this can be accomplished by the following process: (i) providing a starting material comprising an arkose rock based material, a manufactured mineral-based material, or a combination thereof; (ii) processing the starting material (or materials) by crushing, grinding, or other mechanical means to achieve a desired selection of particle sizes of the starting material(s) for subsequent processing; (iii) optionally, separating the desired selection of particle sizes of the starting material(s) by sorting, screening and/or other means to obtain a preferred selection of starting material particle sizes; (iv) optionally washing the preferred selection of starting material particles to remove fines and the like which can be adhered to surfaces thereof by static electrical forces and the like; (v) placing the preferred selection of starting material particles into a bed on a support surface; (vi) placing the bed of the preferred selection of starting material particles into a kiln (the kiln having a preferred starting temperature of less than about 200° C.); (vii) increasing the temperature of the kiln to a basic processing temperature of between about 1150-1225° C. for a basic processing temperature processing time selected to evolve at least about 50% of volatile mineral components located on the surfaces of the preferred selection of starting material particles from the preferred selection of starting material particles; (vii) cooling the kilned preferred selection of starting material particles to an ambient temperature; (viii) any post-processing (e.g., crushing or grinding of any sintered materials) to achieve a desired end-size; and (ix) optionally repeating the process of crushing and kilning the starting material.

FIG. 1 provides a flowchart 100 depicting an exemplary method for manufacturing a porous mineral-based granular material according to at least one method provided for herein. (It will be appreciated that the flowchart of FIG. 1 depicts only one example of a method for manufacturing a porous mineral-based granular material according to the methods provided for herein, and that the method depicted in FIG. 1 can include fewer steps than are indicated, as well as additional steps not shown.) In the exemplary method depicted in the flowchart 100 of FIG. 1 for manufacturing a porous mineral-based granular material, the process begins at step 102 by providing a micaceous-arkose rock material as a starting material. (As described above, the method can also include providing a manufactured mineral-based material, an arkose rock, a sericitized rhyolite, or a sericitized granite as all or part of the starting material. While combinations of these various starting materials can be used, preferably a single type of starting material is used due to the potential different heating temperatures required to form the desired porosity. For purposes of the example depicted in FIG. 1, the starting material is assumed to be a micaceous-arkose rock material.) At step 104 the micaceous-arkose rock starting material is processed (by one or both of grinding and crushing) to achieve a mean diameter of about 0.1 mm to about 0.6 mm. (Other size ranges can also be used.) As will be appreciated, the process of crushing and/or grinding the starting material to achieve the desired mean particle diameter will result in the production of ancillary fines material within the processed arkose rock material. Accordingly, at step 106 the processed micaceous-arkose rock material (from step 104) can be washed and/or leached to remove the fines. At step 108 the cleaned processed micaceous-arkose rock material (from steps 104 and 106) is placed into a bed on a support surface. The support surface can be a solid sheet (such as a sheet of steel) or a screen having a screen size selected to prevent passage of particles of the cleaned processed micaceous-arkose rock material from passing through the screen. At step 110 the support surface (now supporting the bed of cleaned processed micaceous-arkose rock material) is placed into a kiln. Then at step 112 the temperature within the kiln is increased to a basic processing temperature of between about 950° C. and about 1250° C., to subject the bed of cleaned processed micaceous-arkose rock material to the basic processing temperature. At step 114 the basic processing temperature within the kiln is held for a basic processing temperature processing time of between about 15 minutes and about 30 minutes for each centimeter of bed thickness of the cleaned processed micaceous-arkose rock material. Holding the kiln at the basic processing temperature for the basic processing temperature processing time allows the micaceous components to become felsic components, which can then remove metal sulfides from the starting material, and also generate water vapor. The metal sulfides and water vapor are evolved from the starting material through sublimation, vaporization, or combinations thereof, thus creating porosity within the kilned starting material (both surface porosity and interior matrix porosity). Preferably, the kiln is held at the basic processing temperature for the basic processing temperature processing time to allow at least 30% of the metal sulfides which are present in the micaceous-arkose rock starting material (both on the surfaces, and in the near-surface lattices, of the cleaned processed micaceous-arkose rock material) to evolve into a gaseous form. Thereafter, at step 116, the kilned bed of the cleaned processed arkose rock material is cooled to ambient temperature for subsequent use and/or subsequent processing.

Post-processing methods. After the starting material (as described above) has been initially kilned (as also described above), the resulting initial mineral-based kilned material can be further processed, as will now be described. (It will be appreciated that the resulting initial mineral-based kilned material can be used in its own right, without any additional post-processing.) The initial mineral-based kilned material will typically include at least a portion of the granular starting materials that have become sintered to one another. For certain uses it is desirable to crush and/or grind the initial mineral-based kilned material into a particle size that can be used for an intended application (such as, for example, a fill material, or as a material to be used in the manufacture of a unitized formed construction material, as provided for herein below). Accordingly, if the initial mineral-based kilned material is to be used as a fill material (e.g., a material provided for the intended purpose of retaining water or the like, or a material provided below as a primary porous covering surface for essentially the same purpose), then the initial mineral-based kilned material can be crushed and/or ground to the size particularly suitable for the intended use.

Further, the initial mineral-based kilned porous material can be further processed in order to further increase the porosity of the material. Specifically, the initial mineral-based kilned porous material can be crushed (preferably, to a fine to medium sand grain size), and re-kilned according to the procedures set forth above for the initial kilning of the starting materials. The process of crushing the initial mineral-based kilned porous material will expose surfaces of the initial starting materials that were not exposed in the initial kilning, and will thus allow additional volatile mineral components within the starting materials to evolve (i.e., sublime and/or vaporize), thus further increasing the porosity of the starting materials. This process of crushing the kilned starting materials and re-kilning the crushed product (in order to increase porosity of the starting materials by further evolution of volatile mineral compounds therefrom) can be repeated again and again. (When the sintered granular particles are broken apart, new surfaces are exposed which typically include volatile mineral compounds, such as metal sulfides and/or micaceous minerals, that were not reacted, sublimed and/or vaporized previously. By placing the crushed processed material back into the kiln additional porosity can be achieved. It will be appreciated that the level of porosity desired, and to be achieved by this method of re-kilning already kilned starting material, is to be balanced against the cost of crushing and re-kilning the previously processed starting materials.)

Examples of uses for porous granular materials. The present disclosure also provides for mineral-based porous granular material manufactured according to the methods provided for herein. The mineral-based porous granular material provided for herein can be used as an aggregate material for a unitized formed mineral-based construction material, as described more fully herein below. The mineral-based porous granular material provided for herein above can also be used as a fill material (e.g., beneath the unitized formed mineral-based construction materials described more fully herein below), and can also be used as a filter material to remove solids and other components from liquids or gasses (such as air) passing through a bed of the mineral-based porous granular material. By proper selection of the starting materials, the mineral-based porous granular material can also be used as either a fixed or a fluidized bed catalyst.

Use of porous granular materials as a proppant in hydraulic fracturing processes. The mineral-based porous granular material provided for herein can be also used as a proppant in conjunction with a hydraulic fracturing method. Hydraulic fracturing of subterranean reservoirs and formations is performed by injecting a hydraulic liquid into a subterranean formation via a wellbore. Fracturing of the formation enhances the production of desirable fluids (such as oil and gas) therefrom. The injection of the hydraulic fracturing liquid is oftentimes accompanied by the inclusion of a proppant in order to hold open the fissures which result from the hydraulic fracturing. The use of a mineral-based porous granular material (as provided for herein) as a proppant is advantageous from two standpoints. First of all, the mineral-based porous granular material (when used as a proppant) increases the fluid flow (fluid transmissivity) of secondary enhanced oil recovery liquids (such as a surfactant and/or an acid) into the fractured reservoir. Second, the mineral-based porous granular material (when used as a proppant) increases the fluid flow of recovered liquids from the fractured reservoir. Both of these desirable attributes result from the surface porosity of the mineral-based porous granular materials provided for herein. Accordingly, the present disclosure provides for a method of improving enhanced oil recovery by using the mineral-based porous granular material provided for herein as a proppant in a hydraulic fracturing process of fluid-containing subterranean formations.

Use of porous granular materials as a soil supplement. The mineral-based porous granular material provided for herein can be also used as a soil supplement. Specifically, I have discovered that porous granular materials manufactured according to the above disclosure tend to extract moisture from air and conduct the extracted moisture into soil containing the porous granular materials. This is typically achieved during nighttime cooling of air when the dew point allows moisture in the air to adhere to particles (i.e. the porous granular materials) as a result of an imbalance in water saturation between the air and the porous granular materials. Because the porous granular materials will conduct absorbed water molecules into the soil containing the porous granular materials, the air immediately above the upper surface of the soil experiences a lowering of humidity, and in order to maintain equilibrium of humidity within the air, moisture moves from the regions of higher humidity to the areas of lower humidity immediately above the soil. The ability of the porous granular materials to extract humidity from the air, and to transport the extracted humidity into lower levels of the soil, results in a humidity transfer engine which is powered by pore water pressure generated by the high hydraulic conductivity of the porous granular material. Accordingly, the present disclosure provides for a method of improving the ability of soil to extract moisture from the ambient environment by introducing porous granular materials of the present disclosure into an upper layer of existing soil, and particularly to a depth selected to provide moisture to roots of a crop planted within the soil. As such, the uptake of moisture by roots during daytime affords more pore water pressure differential during nighttime. In addition to using kilned porous granular materials as a soil supplement, naturally occurring porous granular material can also be used as a soil supplement to enhance extraction of moisture from the air. The porous granular materials can comprises between about 15% and 40% (by volume) of the upper 30 to 40 cm of topsoil.

Second Embodiment: Unitized Formed Mineral-Based Construction Materials

A second embodiment provides for a method for manufacturing unitized mineral-based construction materials. By unitized construction materials I mean construction materials that are provided as discrete construction components, rather than as a continuous in-situ construction component. An example of a continuous in-situ construction components is, for example, a poured concrete slab, an applied hot paving material, unconsolidated land fill material (such as gravel), etc. Non-limiting examples of unitized construction materials include block materials (such as pavers, bricks, prefabricated slabs, etc.), as well as engineered components such as beams, posts, and architectural components. The unitized construction materials provided for herein are preferably first formed by placing the starting materials into a mold or the like to form a unitized element, and the unitized elements are then processed (as described below) to create a unitized construction material as provided for herein. The process of forming the unitized construction materials generally includes curing cement within the starting materials to achieve a solid unit, and then heating the solid unit in a kiln to achieve high-strength, and preferably porosity (and permeability), of the unitized elements. The process further uses less cement than prior methods for forming unitized construction materials, and in the case of unitized construction materials requires substantially less energy input for kilning than prior art clay-based materials. An additional advantage of the current disclosed methods of manufacturing unitized construction materials over the prior art is a significant reduction in the time required to heat the formed unitized construction materials. Prior art heating regimens for unitized construction materials made primarily from clay typically last between about 24 and 48 hours (including preheating), whereas a heating regimen for a similar sized unit according to the current disclosure is around 6 hours. This not only increases the rate at which the unitized construction materials can be produced, but also significantly reduces the energy required to manufacture the units.

Starting materials for the unitized construction materials provided for herein include an aggregate, a cementing agent, and water. As described below, in certain variations a sublimation agent can also be used. Each of the starting materials will now be described in more detail.

The aggregate for the unitized construction materials can include any mineral-based granular material. Preferably the aggregate is provided as a sand particle, and more preferably as a felsic sand, a micaceous sand, a sericitized igneous sand, or a combination thereof. Such felsic, micaceous and sericitized igneous sands can be provided as components of an arkose rock or a rhyolitic or sericitized metamorphic rock, as described above with respect to the methods for manufacturing porous mineral-based granular materials. However, in certain instances the aggregate can be gravel and/or crushed rock. Combinations of sand, gravel and/or crushed rock can also be used as the aggregate. In certain instances it can be desirable to use porous mineral-based sand, such as can be manufactured by the processes described hereinabove. The aggregate material will typically comprise about 70-80% (by weight) or more of the total starting materials, and preferably between about 85-95% by weight of the finished material. The aggregate preferably has an average mean diameter of less than about 5 mm, and more preferably an average mean diameter of about 1.0 mm or less. When the aggregate is used to form small unitized construction materials (such as pavers, roofing tiles, flooring tiles and the like), it is desirable that the finished unitized construction materials have a smooth finish along the surfaces and edges, in which case the average mean diameter for at least 50% or more of aggregate is between at least about 0.3 mm and at least about 0.6 mm, and more preferably a mean diameter of about 0.5 mm or less.

The cementing agent is used primarily to hold the aggregate into a unitized shape once the mixture of aggregate and cementing agent have been removed from any form used to shape the unitized construction material. Preferably, the cementing agent is a hydraulic cement, such as Portland cement. The amount of cementing agent used is preferably between about 2.5% and 10% (by weight) of the total starting materials. The water of the starting materials is used to initiate and further facilitate the curing process (i.e., the hydration process) of the cementing agent in order to bind the cementing agent primarily to the aggregate (and, to a much lesser degree, to any sublimation agent). The amount of water to be added to the cementing agent is preferably between about 20-40% (by weight) of the cementing agent, and is selected to achieve an essentially complete hydration reaction of the cementing agent with the water. The amount of water to be added to the cementing agent can be as high as about 70% (by weight) of the cementing agent. In addition to adding water to accomplish the hydration reaction in the cement, it is also important that the overall mixture of starting materials have sufficient water to wet the surfaces of the aggregate. Depending on the moisture state of the aggregate at the time of mixing, additional water (in the amount of around 2-3 times the quantity required for the hydration reaction) may need to be added to the mixture of the starting materials. The amount of additional water to be added to wet the aggregate can be determined by performing a slump test, and/or using a moisture meter. It will also be appreciated that removing fines from the aggregate prior to mixing (such as by washing or the like) can reduce the quantity of additional water to be added to the mixture. The cementing agent can also include lime mortar and fly ash. Fly ash (i.e., residues generated by coal combustion) includes substantial amounts of silicon dioxide ($SiO_2$) (both amorphous and crystalline), aluminum oxide ($Al_2O_3$) and calcium oxide (CaO). Fly ash typically also includes trace amounts (the quantity depending upon the source of the coal used to generate the fly ash) of molybdenum and vanadium, both of which can act as sublimation agents, as well as other metal sulfides which can assist in removing calcium from the cured cement once the constituent components are later kilned. The presence of silicon dioxide within the cementing agent also facilitates sintering of components within the starting materials during kilning. In one example the cementing agent can include about 50% (by weight) of fly ash.

As indicated above, the starting materials can further include a sublimation agent, which is used primarily as a sacrificial agent which sublimes during kiln heating of the cured aggregate/cement starting materials. Suitable sublimation agents can also act to facilitate granules of the aggregate to move into closer proximity and contact with one another. That is, the sublimation agent does not necessarily need to sublime during the kilning process, but can act as an assistant component in facilitating the sublimation of other components from the starting materials during the kilning process. (In the following disclosure, comments regarding the sublimation agent as actually subliming should be understood as being limited to those examples where the sublimation agent itself sublimes, but are not considered to limit the sublimation agent as being required itself to sublime, and thus allow for the sublimation agent to aid in the sublimation of other components while not specifically itself subliming.) When the sublimation agent includes a component (such as molybdenum) which is intended to sublime, then the sublimation temperature is preferably less than the calcination temperature for calcium components in the cured cement (e.g., about 450-700° C. (i.e., about 850-1300° F.) for molybdenum disulfide), which is selected to be below the expected sintering temperature of the aggregate (e.g., about 1000-1300° C. (approx. 1800-2300° F.). However, when the sublimation agent is a reaction component such as copper sulfate, then the temperature to which the mixture is to be heated is a temperature at which the copper sulfate (or other selected copper compound) will react with calcium components in the cured (hydrated) cement in order to form compounds such as calcium copper silicates, thus alternating and/or removing reactive calcium oxides from the cured cement. The sublimation agent can have a sublimation temperature of up to about 1200° C., and particularly when the aggregate material includes a minor percentage of clay (which increases the sintering temperature of the aggregate). In this way the likelihood of fracturing sintered aggregate (during the kilning process of the formed unitized construction materials) is reduced. The sublimation agent is preferably a metal sulfide that will not chemically react with the cementing agent during the curing (i.e., hydration) phase of the cementing agent with the aggregate, and/or does not appreciably reduce the ability of the cementing agent to cure to strength in a timely manner. One example of a sublimation agent that can be used in the process is molybdenum disulfide ($MoS_2$). Other examples of a sublimation agent that can be used include tungsten disulfide ($WS_2$), vanadium disulfide ($VS_2$), copper compounds (described more fully below), and zinc compounds. These and some other metal sulfides can sublime from the aggregate and/or the cement, and/or aid in the sublimation of other components from the starting materials. As described further below, during kilning of the starting materials (in order to form the unitized construction materials) a significant quantity (perhaps as much as 70%) of the sublimation agent is evolved (e.g., via sublimation) from the mixture of starting materials in a gaseous form, and/or is chemically reacted with other components to facilitate the sublimation thereof from the starting materials. Any evolved sublimation agent can be recovered and (after processing) reused. The amount of sublimation agent to be used can be between about 5-70% (by weight) of the cementing agent, and preferably between about 10-50% (by weight) of the cementing agent. An additional advantage to using a lubricant such as molybdenum disulfide as the sublimation agent is that molybdenum disulfide acts as a friction reducer between the grains (granules, or particles) of the aggregate, as well as the cementing agent, thus increasing packing of the aggregate/cement, and also improving workability of the mixture of starting materials (as described further herein). The sublimation agent can be an additive to the starting materials, a constituent component of the starting materials (e.g., the aggregate and/or the cementing agent), or a combination thereof.

As an alternative to molybdenum disulfide as a sublimation agent is the use of anhydrous copper sulfate (also known as copper (II) sulfate, cupric sulfate, and generically copper sulfate, having the chemical formula $CuSO_4$, which is to be distinguished from copper (I) sulfate (or cuprous sulfate), having the chemical formula $Cu_2SO_4$). In this instance the copper sulfate ($CuSO_4$) does not sublime directly from the starting materials, but rather acts as an agent to extract metallic components from the micaceous components of the aggregate, and metallic components from the cement, which then combine with calcium components from the cured cement, and the combined extracted metallic components and calcium components are then sublimed from the cured and kilned mixture of starting materials. A particular advantage to the use of anhydrous copper sulfate over molybdenum disulfide as a sublimation agent is that anhydrous copper sulfate is historically available at a much lower cost than is molybdenum disulfide. Further, an additional advantage to the use of anhydrous copper sulfate over molybdenum disulfide as a sublimation agent is that anhydrous copper sulfate appears to provide enhanced properties of permeability (e.g., water conductivity) in the finished product (as indicated in the example herebelow). In addition to copper sulfate ($CuSO_4$) and other copper-sulfur compounds (such as $Cu_2SO_4$), other non-sulfur copper compounds can be used as the sublimation-reaction agent, including copper oxide (CuO), copper carbonates (e.g., $CuCO_3$, $Cu_2CO3$), copper acetate ($Cu(OAc)_2$, where OAc— is acetate ($CH_3CO_2$—)), and copper hydroxide ($Cu(OH)_2$). These non-sulfur copper compounds can be used when the cementing agent and/or the aggregate has sufficient sulfur available to bind with the copper from the copper compound. The copper compound used as the sublimation-reaction agent is preferably selected to avoid the formation of copper oxide in the finished product (which can reduce strength in the end formed unit). Further, copper compounds such as copper halides (e.g., copper chloride) are not desirable as the sublimation-reaction agent. The selection of the copper compound used as the sublimation-reaction agent is selected to tie copper to calcium (from the hydrated cement), and also to ensure that sufficient sulfur is available to combine with freed metal components from the cement and the aggregate to form metal sulfides which can sublimate from the mixture of starting materials.

When the aggregate has a high surface porosity (such as the porous mineral-based sand described above), then a larger quantity of a sublimation agent such as molybdenum is needed (e.g., about 40-70% (by weight) of the cementing agent) since the sublimation agent will tend to be drawn into the surface pores of the aggregate. Further, a previously kilned and crushed clay (such as fine crushed tile material) can be added to the sublimation agent. As the sublimation agent is reduced from the starting materials during kilning, the fine crushed clay will begin to sinter to the aggregate at a temperature starting at about 650° C. (about 1200° F.).

The sublimation agent can also be provided in a paste (or emulsified) form, versus being provided in a powdered form. For example, molybdenum disulfide ($MoS_2$) can be provided in a paste, and mixed in with the other starting materials using a mixer (as described below). Additionally, an emulsified (or paste) form of molybdenum disulfide can be pre-mixed with a clay material, which can aid in forming inter-granular porosity (i.e., pores between the granules of the aggregate) as also described more fully below. Further, calcium molybdate ($CaMoO_4$) can be added to the starting materials as a part of the sublimation agent, but preferably requires additional kilning time to evolve the undesirable calcium component thereof (which can present a reactive component, and thus reduce the chemical resistance of the end unitized construction material product).

In certain instances, when the unitized construction material to be formed is relatively thin in a minimum dimension (e.g., about 1.5 inches (about 40 mm)), and the sublimation agent to be used is copper sulfate (or another copper compound), then the formed unitized construction material (following curing, but prior to kilning), can be immersed in a liquid solution of the copper-based sublimation agent (versus mixing the copper-based sublimation agent in with the starting materials).

The starting materials for the unitized construction materials provided for herein can further include a pre-kilning binding material which aids in solidifying the starting materials prior to kilning (and thus facilitates handling of the formed and cured starting materials). Thus use of a pre-kilning binding material can also reduce the quantity of cementing agent that is required to hold the cured starting materials into a solidified form. (By reducing the quantity of cementing agent in the starting materials, additional direct sublimation of the sublimation agent, and thus increased porosity of the finished product, can be achieved, as described more fully below.) An example of a pre-kilning binding material which can be used in the processes described herein include glass fibers and mineral fibers. An additional advantage to using a pre-kilning binding material (such as a glass fiber) is that at the sintering temperature for the starting materials (described more fully below), the pre-kilning binding material can sinter with the aggregate.

As indicated above, when micas (such as muscovite) are subjected to kilning temperatures in excess of 900° C., they are found to develop desirable microporosity. Rather than using a micaceous sand as a starting material aggregate (or in addition to, in order to provide the desired amount and size of the mica particles), the aggregate can be supplemented with ground mica particles and mixed with quartz particles in order to achieve the desired reaction of muscovite+quartz→K-feldspar+aluminum silicate+steam (or paragonite+quartz→Na-feldspar+aluminum silicate+steam). In this instance the mica particles should be of a size and distribution within the mixture to achieve contact between a large percentage of the mica particles and the quartz particles. Likewise, the starting materials can be supplemented with ground quartz in order to achieve a desired ratio of mica particles to quartz particles (i.e., a ratio of about 1:1), which provides for generally evenly distributed sintering of resulting feldspathic particles to quartzitic particles.

The starting materials for the unitized construction materials provided for herein can also include one or more reinforcing elements, such as steel reinforcing bars and/or reinforcing fibers, which can be embedded within the mixture of starting materials prior to kilning thereof. The use of such reinforcing elements is describe more fully below.

The starting materials for the unitized construction materials provided for herein can also include one or more coloring agents. A coloring agent can include a dye. A coloring agent can also include a chemical compound which reacts with one or more of the other starting materials at (or below) the processing temperature (described below) in order to produce a chemical component in the resulting unitized construction material having a specific hue. Coloring agents can also include compounds such as iron chromate and manganese chromate which are compatible with (i.e., do not degrade) the sintering temperature for the starting materials.

Preparation of starting materials for unitized construction materials. In order to manufacture the unitized construction materials provided for herein, the starting materials are first prepared, then mixed, then formed, then cured, and then kilned, to finally produce the unitized construction materials. The preparation of the starting materials begins by selecting and providing the desired grade of the aggregate (i.e., the particle type, particle size, and particle porosity, or combinations thereof) to be used in the unitized construction materials. The process of providing the starting material aggregate can include screening of a base aggregate material (to achieve desired particles sizes), washing of a base aggregate material (to remove fines), processing of a base aggregate material (for example, kilning, as described above), and mixing of different grades of base aggregate materials (i.e., mixing of different base aggregate materials, or different mineral-based granules). The processing (if any) of the base aggregate material (or materials) results in the starting material aggregate (i.e., the aggregate material that will be used in the manufacture of the unitized construction materials). The preparation of the starting materials further includes providing the cementing agent (preferably, in a fine powdered form), and providing the sublimation agent (if any) either in a powdered form or a paste form. The preparation of the starting materials can further include leaching the base aggregate material in order to remove soluble materials that can later degrade in the finished product. An objective in mixing the starting materials is to obtain adjacency (and contact) of reactants (e.g., cementing agent, aggregate, and any sublimation agent, being in contact with one another in various combinations, and/or being separated by water). When the sublimation agent is a soluble compound (such as copper sulfate), then this adjacency is enhanced since the liquid solution (containing copper) will have increased contact with cementing agents and aggregate components as compared to non-soluble sublimation agents (such as molybdenum disulfide).

Mixing of the starting materials. The mixing of the starting materials (i.e., the aggregate, the cementing agent, any sublimation agent and the water) for the unitized construction materials can be performed in any number of ways. However, the objective is to achieve a homogeneous mixture of the starting materials such that the starting materials are relatively evenly distributed throughout the mixture. A preferred method of mixing the starting materials for the unitized construction materials is to first mix a powdered form of the cementing agent and a powdered form of any sublimation agent (sublimating agent) using a mixer. The powdered sublimation agent can be slowly added to the powdered cementing agent as the two components are mixed using the mixer. The desired mixing time for mixing of the powdered cementing agent and the powdered sublimation agent can be determined by sampling the mixture at selected time intervals (e.g., every 10 minutes), and then viewing the mixture under a microscope to determine if the desired level of mixing has been accomplished. For example, if the mixture of powdered cementing agent and powdered sublimation agent is to be about 80% (by weight) of cementing agent and about 20% (by weight) of sublimation agent, then the mixture of cementing agent particles and sublimation agent particles should be such that any sample of the mixture should desirably include about 83 percent of cement particles and about 17 percent of sublimation agent particles. (For example, molybdenum disulfide, a potential sublimation agent, has a molecular weight of about 160 grams per mole, whereas Portland cement, a potential cementing agent, has an average molecular weight of about 65 grams per mole. Accordingly, in order to achieve a mixture of about 80% (by weight) of cementing agent and about 20% (by weight) of sublimation agent, then the mixture will need to have a ratio of about 8 or more cementing particles for every sublimation particle in order to achieve a stoichiometric proportion for the chemical between the cured cement and the sublimation agent.)

In the preferred method for mixing of the starting materials for the unitized construction materials, once an acceptable distribution of cementing agent materials and sublimation agent materials has been achieved (as described above), then the mixture of the cementing agent materials and sublimation agent materials can be mixed with the starting material aggregate. (If the starting material aggregate is composed of two or more base aggregate materials, e.g., sand and gravel, the base aggregate materials can be first mixed into a generally homogeneous mixture into the starting material aggregate.) Once the starting material aggregate and the cementing-agent/sublimation-agent mixtures have been combined (by mixing) to achieve a relatively homogeneous distribution of the indicated starting material components (as can be determined by microscopic examination of the mixture), then the water can be added to the aggregate/cementing-agent/sublimation-agent mixture. The water is preferably added at a rate (or mixed in over a mixing time) to ensure a generally homogeneous mixture of the aggregate, cementing agent, sublimation agent, and water. The preferred mixing time for the final combination of the aggregate, cementing agent, sublimation agent, and water can be determined by sampling the mixture from time-to-time during the mixing process and examining a sample (e.g., under a microscope) to determine if the desired level of homogeneous integration of the different starting materials has been achieved. In an alternative arrangement when the sublimation agent is provided as a paste, the water and cementing agent can be first mixed, then the sublimation agent added and mixed, and then the aggregate added and mixed. Other variations for the adding and mixing of the starting materials can also be used, with the goal of achieving a homogeneous mixture of the starting materials.

When pre-kilned porous mineral sand is used for the aggregate, the micro-pores on the surface of the aggregate particles (granules) will pull water from the mixture (i.e., aggregate/cementing-agent/sublimation-agent/water) into the micropores, but the pores are too small to pull in cement and/or sublimation agent solids. This will promote tighter packing of the grains of the aggregate (which will result in improved sintering, as described more fully below), and will also improve workability (for molding) of the aggregate/cementing-agent/sublimation-agent/water mixture. The use of pre-kilned porous mineral sand for the aggregate, however, may result in lower porosity in the resulting unitized construction material. Unkilned arkosic micaceous sand can also include naturally occurring sublimation agents (such as metal sulfides), thus assisting in removing calcium components from the cured concrete, and lessening the amount of a separate sublimation agent to be added to the starting materials (or removing altogether the need for a supplemental sublimation agent). In some instances it is desirable that the aggregate of the starting materials include a mixture of pre-kilned and unkilned arkosic/micaceous sand, thus deriving a portion of the benefit of each. As can be appreciated, in this way the resulting unitized construction material can be engineered for porosity, strength and chemical resistance by the selection of the aggregate and the percentages of each type of aggregate to be used.

The mixture of the starting materials can also be processed (prior to curing and kilning) by agitating the mixture with a vibrator or the like in order to remove any air particles from the mixture. This will further facilitate saturating the aggregate with free water (and particularly when the aggregate is pre-processed in order to provide for surface porosity of the aggregate).

Forming the mixed starting materials into the desired shape. Once the desired level of homogeneous integration of the starting materials for the desired unitized construction material to be manufactured from the starting materials has been achieved, then the mixture of the starting materials (which is preferably of a generally flowable or pourable state) can be placed into one or more forms (or molds) for curing.

In one variation, rather than placing the mixture of the starting materials into a mold, the mixture of the starting materials can be extruded into the desired shape of the unitized construction material to be manufactured from the starting materials. As the mixture of starting materials is extruded, the formed extrusion can be cut to the desired length for unitized construction material to be achieved. The extrusion process of forcing the mixture of the starting materials through a die will tend to heat the outer surface of the extruded material (due to friction and the hydration reaction of the curing cement), causing a sufficient drying at the surface to allow the extruded mixture to hold a shape such that the curing process can be performed without the use of a mold.

Curing the starting material within the mold (or form). The curing of the combination of the starting materials within the mold (or molds, or forms) generally follows the process of cement curing (i.e. hydration), and allows the starting materials within the mold (or form) to adhere to one another into a solidified unit which can then be removed from the mold without damage to the solidified unit of starting materials. This solidified unit of starting materials can then be placed into a kiln for further processing (as described below). The time for curing the combination of the starting materials for the unitized construction material depends on a number of different factors, including: (i) the maximum thickness of the starting materials within the mold (or molds, or forms); (ii) the selected starting materials (including quantity of water and any additional compounds added to the cementing agent, such as curing accelerator compounds, air entrainment compounds, etc.); and (iii) the ambient temperature. In general the starting materials are cured within the mold (or form) for a period of time which allows the starting materials to solidify to a degree such that they can be removed from the form, and transferred to a kiln, without damage to the cured starting materials. Further, as indicated above, if the mixture of starting materials is extruded (rather than being formed in a mold), then the curing process can be performed outside of a mold. Also, in another variation the mold containing the cured starting materials can be placed in the kiln such that the cured starting materials do not need to be removed from the mold prior to kilning. It will be appreciated that when I refer to the starting materials as being or becoming solidified, this means that the unit of starting materials can be removed from the mold (or extracted from an extruder) and handled without the shape of the unit becoming distorted due to a flowing of the starting materials. In certain instances interior portions of the formed unit of starting materials can be in a flowable state, but are constrained due to the exterior portions of the unit being in a solidified state. It will further be appreciated that the state of being solidified is a relative term, and that some materials (e.g., glass), which are typically considered in general parlance to be solid, will in fact will flow, given sufficient time. Accordingly, the use of the terms solid, solidify, solidified, etc. herein does not mean that the unit of starting materials cannot and will not flow (given sufficient time), but only that the unit of the starting materials will retain its shape for a period of time sufficient to allow the unit of starting materials to be removed from a mold (or an extrusion unit), placed into a kiln, and subsequently kilned.

Kilning of the cured starting materials in order to form the unitized construction materials. The formed (solidified) starting materials for the unitized construction materials are placed in a kiln at about ambient temperature (or at a temperature preferably not exceeding about 90° C. (about 200° F.)). The kiln can be held at a temperature of about 90° C. (about 200° F.) for a period of time (e.g., 2 hours per inch of thickness (i.e., maximum dimension)) in order to vaporize water from the solidified starting materials. Removal of excess water from the formed (solidified) starting materials is desirable to reduce the likelihood of cracking of the solidified starting materials which can result from rapid vaporization of water in the solidified starting materials. (Alternately to drying the formed (solidified) starting materials in the kiln, they can be dried outside of the kiln prior to kilning to remove water.) The kiln temperature is then increased to a temperature selected to sinter the aggregate granules to one another. Depending on the aggregate being used, the kiln temperature is increased to a processing temperature of between about 1000° C. and 1250° C., and more preferably between about 1065° C. and 1150° C. (about 1950°-2100° F.). When a copper-based compound is used as the sublimation-reaction agent, then the kilning temperature is preferably less than about 1120° C. (about 2050° F.) in order to avoid melting of di-copper-sulfide (which melts at about 1130° C. (about 2070° F.)). As the kiln temperature passes through the temperature range of about 450° C. and about 965° C. (about 840° F. to about 1770° F.) the sublimation agent (for example, molybdenum disulfide, $MoS_2$) will oxidize (in the case of molybdenum disulfide, the reaction is to $MoO_3$), and the oxidized sublimation agent will then react with residual lime (e.g., CaO and $Ca(OH)_2$) from the cementing agent curing process. For molybdenum disulfide as the sublimation agent and Portland cement as the cementing agent, the reaction is $MoO_3+CaO \rightarrow CaMoO_4$. (A stoichiometric equivalent is achieved at about 3 parts cement to about 1 part $MoS_2$ (by weight).) Preferably the rate of temperature increase for the kiln from the initial temperature to the processing temperature is about 260-540° C. (500-1000° F.) per inch, based on the minimum dimension of the formed and cured starting materials. Further, as the kiln temperature is increased from the initial temperature to the processing temperature, the temperature can be held in a temperature range for sublimation of the sublimation agent to allow a large quantity of the sublimation agent to evolve before sintering of the aggregate begins. The kiln is held at the processing temperature for a period of at least about 30 minutes per inch of thickness (based on the minimum dimension of the formed and cured starting materials). The kiln can be held at the processing temperature for longer periods of time (for example, about one hour per inch of thickness of the formed starting materials). A longer kilning time at the processing temperature provides for a higher degree of sintering of the aggregate, but also reduces porosity of the formed materials. Thus, the kilning time at the processing temperature is selected based on the desired properties of the end unitized construction materials. That is, a shorter kilning time (at the processing temperature) is used for a unitized construction material desired to have high porosity but relatively low crush strength versus a longer kilning time (at the processing temperature) for a unitized construction material desired to have high crush strength but relatively low porosity. After the kiln has been maintained at the processing temperature for the desired period of time, the kiln can then be cooled to the ambient temperature at a rate of about 540-815° C. (1000-1500° F.) per hour per inch of thickness (minimum dimension) of the unitized construction material.

When micaceous arkose sand is used as the aggregate then the evolution of muscovite+quartz to K-feldspar+aluminum silicate+steam (or paragonite+quartz to Na-feldspar+aluminum silicate+steam), occurs at temperatures beginning at about 900° C., thus forming porosity and permeability in the aggregate. The muscovite can be substituted by sericitized or serite mica or other white (low iron) mica. However, in order to achieve the desired sintering between the aggregate granules, and also between aggregate and cement, a kilning temperature in excess of at least about 1000° C. is desirable or alternately, holding the kiln at a temperature of about 1000° C. for a longer period of time.

In certain instances it is desirable that the kilning of the formed, cured and solidified starting materials for the unitized construction materials be performed under a partial vacuum. This can be accomplished by providing a kiln that allows for a partial vacuum (i.e., an internal pressure below an ambient pressure of one bar (one atmosphere, or less than about 14 psi, or less than about or about 97 kPa) to be achieved within the kiln. Placing the kiln under a partial vacuum during kilning of the cured and solidified starting materials can reduce oxidation of the sublimation agent, thus increasing the amount of sublimation agent (e.g., molybdenum disulfide) that sublimates directly, and thus increasing the porosity of the finished unitized construction material. More specifically, and as described above, a sublimation agent of molybdenum disulfide ($MoS_2$) will react (under a temperature of greater than about 450° C.) with calcium oxide in the cement to form calcium molybdenum oxide ($CaMoO_4$). By reducing oxygen within the kiln (either by reducing the atmospheric pressure within the kiln, or by injecting an inert gas within the kiln to displace oxygen), less of this reaction will occur, and a greater portion of the molybdenum disulfide will sublime directly. (A reduced atmospheric pressure within the kiln is preferred in this instance, since the lower pressure will tend to promote sublimation.) Direct sublimation of the molybdenum disulfide will create more inter-granular porosity (i.e., between the aggregate granules) than will the reaction (and subsequent vaporization/sublimation) of $CaMoO_4$.

The porosity in the final unitized construction material is due to two sources: inter-granular porosity (i.e., pores between sintered faces of the aggregate) and porosity of the aggregate. For example, if porous mineral-based sand (as described above) is used for at least part of the aggregate, then the porous mineral sand will provide essentially microscopic (almost molecular level) porosity on the surfaces of the porous mineral sand, as well as porosity throughout the entire matrix of the sand grain. This fine porosity not only allows the finished unitized construction material to hold a large quantity of a liquid (such as water), but can also act as a filter to remove fine solids from the liquid. Beyond porosity, the final unitized construction materials also exhibit a high permeability by virtue of interconnected vapor channels which are formed during the kilning process (as described below), which provides for good fluid conductivity (both liquid and vapor) through the final unitized construction materials.

It will be appreciated that a large variety of unitized construction materials can be provided for according to the above description, given the large number of variables that can be used in formulating the starting materials therefore (i.e., including variations in the starting materials (e.g., the aggregate, the cementing agent and the sublimation agent), and variations in the kilning temperatures and kilning temperature regimen). Accordingly, the above method can include selection of parameters (e.g., starting materials and a kilning time/temperature regimen) preselected (or engineered) in order to produce a final unitized construction material conforming to desired specifications (e.g., porosity, permeability, chemical composition, and crush-strength). That is, the above-described process provides methods for the manufacturing of various engineered unitized construction materials (i.e., unitized construction materials manufactured according to specifically selected specifications with regard to at least porosity, strength (both tensile and compressive), chemical composition, resistance to chemical attack, and resistance to freeze-thaw breakdown).

Exemplary description of porosity formation for unitized construction materials using Portland cement as a cementing agent and molybdenum disulfide as a sublimation agent. In the instance where the unitized construction materials use Portland cement as the cementing agent and molybdenum disulfide as the sublimation agent, then the inter-granular porosity (i.e., pores formed between granules of the aggregate, versus pores formed on the surface of the aggregate) is formed by the sublimation and/or vaporization of components between the aggregate granules, coupled with the sintering of the aggregate granules to one another as well as the cement. More specifically, the sintering (which mostly occurs between about 1040° C. and about 1250° C. (about 1900° F. and 2280° F.) is the result of: (i) fusing of quartz in the aggregate; (ii) fusing of feldspar sand (when used for, or as a part of, the aggregate, and especially sodic and/or potassic components thereof, or resulting from the thermal decomposition of mica within the aggregate); (iii) calcium silicate in the cured cement; (iv) any residual calcium molybdate (which results from reaction of molybdenum disulfide sublimation agent with the calcium components in the cured cement); and (v) zinc sulfide (ZnS), and other volatile metal sulfides, which may be present in unfired felsic sand used in the aggregate, or in fired sand that has been recrushed (as described above). In any event, it is desirable to hold the kilning temperature somewhat lower than the softening temperature of feldspar (about 1250° C.) in order to avoid the feldspar becoming liquid and thus blocking flow channels when cooled. At the preferred sintering temperature a partial melting of the sodic and/or potassic elements in the feldspar aggregate allows sintering to occur. Further, solid sintering of silica, aluminum silicate and calcium silicate occurs, as well as plastic deformation and partial sublimation of any exposed zinc sulfide. As described above, the finished unitized construction materials provided for herein can include two kinds of porosity: (i) aggregate porosity (i.e., porosity on the surfaces and within the matrix of the aggregate); and (ii) inter-granular porosity (i.e., porosity between the granules of the aggregate and/or the cured cement. The porosity is provided by pores which can have dimensions (i.e., width and depth) of about between about 10 nanometers and about 100 nanometers or less. The porosity of the unitized construction materials results from (i) sublimation and/or consolidation of metallic components (such as zinc sulfide and other volatile metal sulfides) on exposed surfaces, and within the matrix, of the aggregate and the cured (hydrated) cementing agent during kilning of the starting materials used for the unitized construction materials; (ii) sublimation and/or consolidation of calcium components (which are a result of the cement curing hydration process) during kilning of the starting materials; (iii) the formation of pores (and channels) between adjacent components of the starting materials during the kilning process; and/or (iv) the sintering process which occurs (during kilning) between the aggregate, the cured cementing agent, and compounds evolved (i.e., generated) as a result of chemical interactions between the sublimation agent (or sublimation-reaction agent) during the kilning process. When the aggregate includes micaceous components (or other components, as described herein) which act as precursors to feldspathic compounds, then the reaction (as described above) tends to generate steam as a byproduct. The evolution of the steam (and other volatile compounds) from the solidified unit of the starting materials and into the kiln forms flow channels within the solidified unit. These flow channels provide for permeability in the finished units of the construction materials. The high porosity, coupled with the high permeability, provide for finished unitized construction materials which can pass large volumes of fluids, as well as entrain large volumes of liquids.

As indicated herein, in order to manufacture a unitized construction material having high porosity, high permeability, and high strength, an aggregate which includes micaceous components as well as quartzitic components is desirable. The ratio of micaceous components and quartzitic components within the aggregate is preferably on the order of about 1:1 (on a ground-mass basis). (This ratio allows for a good distribution of bonding, by sintering, of resulting felspathic components to quartzitic components within the mixture.) This desired ratio of micaceous components to quartzitic components can be found in certain native rocks (e.g., the Precambrian rocks of the Burke formation). However, when native rocks having this desired combination are not available, then the available source rock used for the aggregate can be supplemented by providing mica and/or quartz in order to achieve the desired ratio. In any event, the conversion process from the micaceous and quartzitic components, in the presence of the cured (i.e., hydrated) cement components, is believed to occur as follows during the kilning process. Initially, the micaceous components within the aggregate are converted into feldspar, water, aluminum silicate and metal sulfides. (The conversion of micaceous components within the aggregate into feldspathic components does not result in the removal of any elements by sublimation or the like, but rather results in the generation of denser chemical compounds within the matrix of the aggregate, thus creating porosity throughout the aggregate.) Then the water and metal sulfides pick up the calcium components (i.e., calcium oxide and calcium hydroxide) which were generated by the cement during the hydration (i.e., curing) process, and these calcium components are removed by sublimation and/or vaporization (as calcium metal oxides or otherwise). The remaining forms of calcium left in the unitized formed construction material (e.g., calcium silicate and calcium-metal-sulfides that don't sublime) are generally non-reactive forms of calcium, thus improving resistance to chemical attack of the formed construction material from components such as ice melters and the like. Further, during the kilning process, the resulting feldspathic components sinter with the quartzitic components of the aggregate in order to form a strong unitized construction material.

It will be appreciated that the unitized construction materials provided for herein differ significantly from prior art unitized construction materials (such as clay-based kilned bricks and cement-based bricks). Specifically, the unitized construction materials provided for herein can have very high tensile and compressive strengths, along with high permeability and/or porosity. More specifically, prior art unitized construction materials manufactured by a cementing process (i.e., cement and aggregate, to form concrete) derive their strength from the chemical hydration reaction of the cement materials on the aggregate (typically sand or gravel). By comparison, the unitized construction materials provided for herein derive their strength primarily from the sintering of the aggregate and/or pre-cured cement particles to one another, which provides a much greater strength (tensile and compressive) over prior art cemented unitized construction materials. Further, prior art unitized construction materials manufactured by a cementing process provide for a much lower permeability and/or porosity than can be achieved using the processes described above for the unitized construction materials provided for herein. A still further advantage of unitized construction materials provided for herein over prior art cemented unitized construction materials is that the unitized construction materials provided for herein provide enhanced resistance to degradation from exposure to chemicals (such as ice melters and the like, which can attack the calcium oxide in cured cement) due to (i) the much lower quantity of cement used in the preparation of the comparable starting materials (and thus, less resulting calcium oxide); and (ii) the fact that the cured cement component most susceptible to chemical attack (i.e., calcium oxide) tends to be removed from the unitized construction materials provided for herein by the reaction process with a sublimation agent. Additionally, the unitized construction materials provided for herein have increased resistance to degradation by fire over prior art concrete-based unitized construction materials. That is, the large quantity of cement present in prior art concrete-based unitized construction materials makes them susceptible to calcination at temperatures above about 750° C. (and thus, weakening of the overall matrix) when exposed to high temperatures, whereas the low percent of calcium oxide in the unitized construction materials provided for herein, as well as the high-temperature sintering of the aggregate, makes the unitized construction materials provided for herein extremely resistant to fire temperatures up to about 980° C. (about 1800° F.).

Additionally, prior art unitized construction materials manufactured by a kilning process (such as bricks, including those manufactured according to the process described in U.S. Pat. No. 7,621,692) differ from the unitized construction materials provided for herein at least in that: (i) the unitized construction materials provided for herein can include a much greater degree of overall porosity (due to the ability to provide micro-pores on the surfaces, and within the matrix (i.e., lattices) of the aggregate prior to kilning resulting from using a non-kilned micaceous arkosic sand (or other suitable aggregate materials, as described above) as at least a portion of the aggregate, as well as to the sublimation of the sublimation agent during kilning); (ii) the unitized construction materials provided for herein include a much higher degree of permeability (or water conductivity) as compared to the prior art; (iii) the unitized construction materials provided for herein can be formed in more complex shapes due to the pourable nature of the starting materials (versus being restricted to a shape that can be compressed within a mold without extraordinary additional processing steps); and (iv) the unitized construction materials provided for herein allow for a smooth finished surface and edges (due to the workability of the starting materials, as aided by the uncured cement and the sublimation agent), as opposed to prior art compaction of clay. Of note, prior art porous ceramic unitized construction materials are manufactured by consolidating the starting materials using high pressure compaction (which generates a porous matrix of the starting materials), and then subjecting the consolidated unit to high temperature to fuse adjacent grains to one another. In this prior art process, no porosity within the grains themselves is achieved due to the selection of the starting materials (i.e., clay and quartz-based sand), or as a result of kilning the consolidated unit of the starting materials. In fact, a prior art consolidated unit of starting materials is less porous, and less permeable, after kilning than before kilning due to grains of the starting materials sintering to one another and progressive closing of air gaps between grains. By comparison, the method of manufacturing unitized construction materials of the current disclosure begins by first forming a flowable paste of the starting materials (i.e., the aggregate, the water and the cement), and then placing this paste into a mold. At this point the paste within the mold has essentially no permeability whatsoever. (Recall that the aggregate is preferably of fine, almost powder-like, consistency.) During the curing process (i.e., hydration of the cement), the paste becomes a solid unit, still having little or no porosity. It is only during the subsequent kilning process that the porosity results from (i) transformation of any micaceous components within the aggregate into felsic (and other) components, (ii) sublimation of metal sulfides from the aggregate, (iii) scavenging of calcium components (which resulted from the hydration reaction of the cement), (iv) vaporization of any water (either original or generated by subsequent chemical reaction), and (v) sintering of the evolved (or original) felsic components with adjacent quartz grains. Still further, when a prior art consolidated unit of starting materials is then kilned, the resulting unit is reduced in size (in all dimensions) by a significantly measurable amount as a result of the sintering process. By comparison, the end product units of unitized construction materials of the present disclosure are much less reduced in size from their pre-kilned size. Further, with respect to item (ii) above regarding enhanced permeability of the unitized construction materials provided for herein over the prior art, during the kilning process of the starting materials water and other volatile components (including sublimation components)

are evolved, and thus are released from the mixture of the starting materials by forming vapor passageways which allow the volatile components to be released from the starting materials. (This process of forming fluid passageways, or permeability, is further facilitated by sublimed metal sulfides chemically binding with calcium components from the hydrated cementing process and subsequently evolving from the starting materials in a gaseous form.) It is the formation of these fluid passageways within the kilned starting materials which results in the enhanced permeability over the prior art of the end product of unitized construction materials of the present disclosure. This enhanced permeability can be exhibited as water conductivity and/or any fluid conductivity through the end product units of unitized construction materials of the present disclosure. However, water conductivity through the end product units of unitized construction materials of the present disclosure is particularly enhanced over the prior art by virtue of capillary interaction between water molecules and the interconnected micro-pores of the unitized construction materials, In fact, the water conductivity of the end product units of unitized construction materials of the present disclosure actually increases over time once the micro-pores of the unitized construction materials become wetted due to this capillary activity, as well as subsequent gravity flow through the interconnected flow channels within the matrix of the end product units. By comparison water conductivity of prior art porous unitized construction materials decreases over time as the matrix of pores becomes water filled.

The unitized construction materials provided for herein can include the following additional advantages over prior art unitized construction materials: (i) decreased density (and thus, overall weight for components of essentially identical dimensions) due to the increased porosity in the unitized construction materials provided for herein; (ii) increased ability to retain and/or pass water (or other liquids) due to increased porosity and permeability that can be provided for in the unitized construction materials provided for herein; (iii) improved sound insulation properties (due to higher occurrence of void space within the unitized construction material); (iv) improved thermal insulation properties (assuming the outer surfaces are sealed by a covering, thus preventing thermal convection); and (v) improved surface adherence of paints, stains, adhesives, etc. due to surface micro-porosity that can be provided by the unitized construction materials provided for herein. As described above, by selection of the starting materials and the kilning temperature regimen (and in particular, the duration of the sintering time), the unitized construction materials provided for herein can be engineered for specific intended uses. Thus, for example, if the intended use of the unitized construction materials is for a structural beam, then permeability is generally not a consideration, and the starting materials can be kilned for a longer sintering period of time (as compared to a unitized construction material where high permeability is desired). This will result in a structural beam that is much lighter in weight, and at least as strong (in tension and compression) as a prior art beam formed using a concrete-based manufacturing process.

Example I: Fabrication of porous unitized formed mineral-based construction materials using micaceous arkosic sand. In one example two blocks were fabricated using the above-described process, both blocks having the following dimensions: 10 cm×10 cm×4 cm. The first block was fabricated using porous mineral based sand (as provided for herein above) as the aggregate, and the second block was fabricated using more than 80% of unkilned mineral based micaceous arkosic sand as the aggregate. (The starting material sand used in both instances was the same—micaceous arkose based sand—with the difference being that the sand for the first block was pre-kilned to increase porosity on the surfaces of the sand.) Both blocks used a mixture of Portland cement and molybdenum disulfide in a mixture of 60 grams of cement to 20 grams of molybdenum disulfide paste. Both blocks were fired in a kiln at the same temperature and for the same period of time. After removing the blocks from the kiln the first block (using the porous mineral based sand) weighed 765 g, and the second block (using non-kilned sand) weighted 783 g. Further, the first block was found to hold 92 g of water, and the second block was found to hold 60 g of water (i.e., a 50% increase in water absorption by using the pre-kilned porous mineral based granular sand aggregate). However, the block fabricated using non-kilned sand is expected to have higher permeability over the block fabricated using pre-kilned sand, due to the formation of interconnected fluid flow channels resulting from the transformation of micaceous components within the aggregate into felspathic components and water vapor which creates the flow channels, and the evolution of metallic components which creates porosity on (and within) the grains of the starting materials.

Example II: Comparison of porous unitized formed mineral-based construction materials using micaceous sand with prior art ceramic tile material. In the second example test samples of porous unitized construction materials were fabricated using a method provided for herein (with the aggregate having greater than 50% ground mass of micaceous arkosic sand as the aggregate), and the results compared with similar sized prior art porous ceramic materials (generally fabricated as provided for in U.S. Pat. No. 7,621, 692). The test samples were sized as follows: for compressive strength tests, tile dimensions were 100 mm×100 mm×40 mm; for water conductivity tests, tile dimensions were 100 mm diameter×40 mm thick. The test tiles according to the present disclosure were fabricated as follows:

Aggregate: 1500 gm micaceous arkose sand (no pre-kilning), approx. 50% (ground mass) muscovite mica, graded to +200/−18 mesh, with an average aspect ratio of about 3:1;
Cement: 180 gm Portland cement;
Sublimation agent: 60 gm molybdenum disulfide;
Water: 400 gm*.
Heating: test tiles were placed in a kiln and the kiln temperature was increased at rate of 450° F. per hour to a temperature of 2050° F., then held at 2050° F. for 1.75 hours; then cooled at rate of about 750° F. per hour.
Total water, including any free water present in the aggregate.
Test results: the results of various tests on the porous tiles fabricated according to the current disclosure, and the prior art porous ceramic tiles, are as follows:

|  | Tiles of the present disclosure | Prior art tiles |
|---|---|---|
| Water capacity: | 110 gm (~27.5% vol)* | 80 gm (~20% vol) |
| Compressive strength: | 8800 psi | 8500 psi |
| Water conductivity** | 7 inches/hr | 1.7 inches/hr |

*About 400 ml
**Based on a constant water column of 30 inches

The results indicate that the porous construction materials of the present disclosure have a much higher rate of water conductivity (i.e., permeability) than do prior art porous tiles having comparable compressive strength. It is contended that the feldspar (resulting from the muscovite+quartz→K-feldspar+aluminum silicate+steam reaction) acted as the primary sintering agent between the particles of aggregate, and between aggregate and concrete. Further, the majority of the porosity and the permeability is contended to result from this reaction, supplemented by the liberation of calcium oxide (and calcium hydroxide), and the sublimation of metal oxides formed from metal sulfides.

Example III: Comparison of porous unitized formed mineral-based construction materials using micaceous sand, and no sublimation agent, with prior art ceramic tile material. Another test was performed along the lines of Example II, but in the third example no sublimation agent was used. All of the starting materials for the test tiles according to the present disclosure were the same as in Example II (with the exception that the quantity of water was increased by not more than 20%), and no sublimation agent was used. The test results were as follows:

|  | Tiles of the present disclosure | Prior art tiles |
|---|---|---|
| Compressive strength: | 3100 psi | 8500 psi |
| Water conductivity* | 7.4 inches/hr | 1.7 inches/hr |

*Based on a constant water column of 30 inches

In this third example it is believed that the calcium silicate (CaSiO) of the cement is sintered to adjacent particles of the sand aggregate (thus chemically bonding the calcium silicate to provide enhanced resistance to chemical degradation due to exposure to chemicals such as ice melters), and the calcium oxide is removed via the reaction with naturally occurring sublimation agents within the aggregate and the cement (in the manner described above).

Example IV: Same as Example II, but using anhydrous copper as sublimation agent. In this example a unitized construction material was fabricated as follows:

Aggregate: 750 gm micaceous arkose sand (no pre-kilning), approx. 50% (ground mass) muscovite mica, graded to +200/−18 mesh, with an average aspect ratio of about 3:1;
Cement: 90 gm Portland cement;
Sublimation agent: 60 gm copper sulfate;
Water: 200 gm.
Heating: test tiles were placed in a kiln and the kiln temperature was increased at rate of 450° F. per hour to a temperature of 2050° F., then held at 2050° F. for 1.75 hours; then cooled at rate of about 750° F. per hour.

Test results: the results of various tests on the porous tiles fabricated according to the current example, and the prior art porous ceramic tiles, are as follows:

|  | Tiles of the present disclosure | Prior art tiles |
|---|---|---|
| Water capacity: | 110 gm (~27.5% vol)* | 80 gm (~20% vol) |
| Compressive strength: | >9000 psi | 8500 psi |
| Water conductivity** | >25.0 inches/hr | 1.7 inches/hr |

*About 400 ml
**Based on a constant water column of 30 inches

In this fourth example it is believed that the copper reacts with a portion of the calcium oxide in the cement to form calcium copper silicate. The copper in the copper sulfate does not appear to sublime in significant quantities, but rather facilitates sublimation (and vaporization) of other compounds. Further, the calcium copper silicate is believed to facilitate in sintering, thus accounting for the higher compressive strength over the use of molybdenum disulfide.

In yet another example (generally corresponding to the parameters of Example II) the amount of a sublimation agent was reduced, and the sintering time was increased, resulting in a test tile having a compressive strength of 12,000 psi and a water conductivity of approximately 2 inches of water per hour. In this example the rate of water conductivity is generally the same (or slightly greater) than the prior art porous tiles (1.7 inches per hour), but the compressive strength of the tiles is increased by more than 40% over the compressive strength of the prior art porous tiles.

From the examples provided above it can be appreciated that porous mineral-based construction materials (such as tiles and the like) manufactured according to methods provided for herein provide for substantially increased rates of water conductivity, while providing similar strength to prior art porous mineral-based construction materials. Further, as can be appreciated by the examples, the porous mineral-based construction materials provided for by the present disclosure can be provided as engineered materials—i.e., desired properties of water conductivity and strength can be selected, and then the porous mineral-based construction materials can be fabricated to achieve the desired properties by varying the starting materials (e.g., type of aggregate to be used), the kilning time, and the inclusion (or omission) of a sublimation agent (among other variables provided for herein).

I have also found that formed unitized construction materials manufactured in general accordance with the previous description can be affected by the presence of iron in the components (i.e., in the cementing agent, the aggregate, the mix water, and/or as iron oxide (rust) introduced by the equipment used to mix the components). In general, the presence of iron in the components used to manufacture the formed unitized construction materials provided for herein is undesirable, as this iron can later react with the other components of the mixture, or with external components (e.g., air, rain, ice melters, etc.), thus potentially reducing the strength of the formed unitized construction materials. While it is preferable to provide mixture components for the formed unitized construction materials which are low in iron content, availability considerations can make this economically impractical. Accordingly, it is desirable to find a way to either remove, or render chemically inert, iron within the mix components of the formed unitized construction materials such that the formed materials do not later suffer deterioration in strength due to the presence of iron. I have found that one method for doing this is by introducing an excess amount of the sublimation agent (e.g., molybdenum disulfide—$MoS_2$)) into the mix materials, such that the sublimation agent chemically bonds with the iron, thus rendering the iron chemically inert to future reactions with elements such as oxygen and the like. (While the preferred sublimation agent is molybdenum, other sublimation agents such as tungsten disulfide and vanadium disulfide can also be used, as described above.) As described above, a primary purpose of the sublimation agent is to chemically bond with reactive calcium oxide components in the Portland cement (e.g., calcium hydroxide ($Ca(OH)_2$), and/or calcium carbonate ($CaCO_3$)), and then to sublimate these components from the mixture during kilning, thus removing the potentially reactive calcium from the mixture of components. As described above, this not only creates porosity and permeability in the formed unitized construction materials (by way of the evolution of the subliming molybdenum-calcium gasses (e.g., CaMoO$_4$), but also increases resistance to future chemical deterioration of the formed materials which can result from chemical reactions with these calcium oxide components.

More specifically, I have found that by increasing the amount of the molybdenum disulfide sublimation agent from a minimum of 10% of the cementing agent (by weight) to a minimum of 25% (but still limiting the upper limit to about 50% by weight), and by increasing the kilning temperature from a range of from 1000° C. to 1350° C. to a range of from 1115° C. to 1350° C., most available iron within the mix materials for the formed unitized construction materials can be chemically bonded by the excess sublimation agent, and thus rendered chemically neutral. More specifically, the additional molybdenum disulfide sublimation agent is available to react with available iron (or, indeed, other metals within the mix materials, such as manganese), and the elevated base kilning temperature ensures that the molybdenum-metal component (e.g., iron molybdate—FeMoO$_4$) will become a liquid, and thus will sinter with (i.e., coat onto) the aggregate and the calcium silicate of the cement component. When the subsequently formed unitized construction material is cooled to ambient temperature, the available iron in the formed unit will thus be rendered essentially chemically inert when the unit is subjected to temperatures below 1115 C, even when in the presence of metal reactive elements such as oxygen or oxide components (such as acids).

In this embodiment the aggregate can include 50% or more (by weight) of mine tailings. Typically mine tailings are undesirable for use as an aggregate in concrete products due to the presence of metals in the tailings. However, by adding the surplus sublimation agent (as described above) to the product mix, these metals can be rendered chemically inert after they are incorporated into the finished unitized construction material. Accordingly, this embodiment provides an advantageous way to consume mine tailings, which are generally considered undesirable waste products which can present environmental hazards.

It will be appreciated that the formation of iron molybdate—FeMoO$_4$—(or indeed, any sublimation-agent-metal-oxide) sintered onto the aggregate and/or cement components of the finally-formed unitized construction material (i.e., the final formed unit) will tend to reduce the porosity and permeability of the finally-formed unitized construction material. Accordingly, when the objective is to produce a final formed unit having advantageous attributes of porosity and permeability, and the mix components can include potentially deleterious reactive iron (or other metals), then it is preferable to first perform tests on the mix components to determine the presence of reactive iron (or other metals), and to then select the additional amount of sublimation agent (e.g., molybdenum disulfide) to be provided in order to achieve a stoichiometric ratio of surplus sublimation agent to free metal, in order that the free metals are chemically bonded by the sublimation agent, which is in turn sintered onto the aggregate and/or cement grains by way of the selected kilning (processing) temperature. Thus, the kilning temperature should be selected to be above the melting point of the sublimation-agent-metal compound, such that when cooled the sublimation-agent-metal compound sinters onto the aggregate and/or cement particles in the mixture of components. Further, in the presence of excess iron in the mix components, it can be desirable to add additional calcium, and/or sublimation agent (e.g., molybdenum disulfide) to the mix components in order to increase (or maintain) the porosity/permeability of the finished product by forming preferred chemical bonds between the added calcium (or sublimation agent), versus sintering the iron onto the aggregate (which will tend to reduce the porosity/permeability of the finished unit).

As indicated above, the deposition of surplus sublimation agent (due to kilning at temperatures above the melting point of the sublimation agent, or metal compounds which can be formed therewith) onto the solid constituent components of the mixture (e.g., the aggregate and/or the cement) can serve to reduce porosity and/or permeability of the final formed unit. However, these sintered bonds between the sublimation agent and the aggregate/cement can also increase the strength (compressive and tensile) of the final formed unit. Accordingly, when porosity and/or permeability are not a primary concern, then extra sublimation agent can be added to the mix components for the formed unitized construction materials in order to produce a unit with high compressive and tensile strength, and which is resistant to chemical deterioration. To this end, additional iron components (in the form of iron oxides), as well as other metal components, can also be added to the mix components in order to form desirable bonds between the sublimation agent and the constituent components of the aggregate and/or the cement. Examples of such bonding components can include the following: (i) as examples of sublimation agents, molybdenum-based compounds and tungsten-based compounds, and, (ii) as examples of supplemental metal compounds, iron oxides and manganese oxides.

When an iron oxide (or other metal-oxide) is added as a separate component (and not as a constituent part of the starting materials), it is preferably first mixed with the cement or the aggregate. In this embodiment, sufficient surplus sublimation agent is added to the component mix such that the sublimation agent bonds with the calcium (more specifically, with the calcium hydroxide) in the cement, and then combines with the iron (or other provided metal) at a kilning temperature sufficient to melt the metal-sublimation agent, and allow it to sinter onto the aggregate via the calcium bond between the cement and the aggregate. While the preferred sublimation agent is molybdenum disulfide, other sublimation agents (such as tungsten disulfide and vanadium disulfide) can also be used. Further, while iron oxide is the preferred metal to be used to bind the sublimation agent to the calcium in the cement, other metal oxides (such as manganese) can also be used. In general, what is desired for this formulation is a metal oxide which will combine with the sublimation agent, and which (in combination of the two as the molten metal oxide/sublimation agent) will also bond with the calcium component of the cement (and/or directly onto the aggregate), and will remain attached once cooled below the melting point, thus chemically bonding the metal oxide/sublimation agent component to the cement and/or aggregate components of the formed unit. To the same purpose, the chemical bond (from sintering) between the metal-oxide/sublimation-agent and the cement/aggregate is a highly chemical stable bond following cooling of the formed construction unit. In this variation the added metal component can be at least 5% (by weight) of the starting materials.

In one example, the metal oxide is iron oxide (Fe$_2$O$_3$), and the sublimation agent is molybdenum disulfide (MoS$_2$). In this example the formed unitized construction unit is kilned at a temperature of at least 2039 F (1115 C), which is the melting point of iron molybdate (FeMoO$_4$), in order to sinter the iron molybdate onto an aggregate (or cement) particle in the formed unitized construction material. Preferably in this example, the kilning temperature is 2100 F to ensure that the desired chemical bonds are formed.

Inclusion of reinforcing elements into the of unitized construction materials. As indicated above, the starting materials for the unitized construction materials can include reinforcing elements. The reinforcing elements are preferably provided as high temperature metal components, and can include metal fibers and metal structural elements. In one example the reinforcing elements can include steel fibers (and more preferably, high chromium stainless steel fibers). The size (length and diameter) of the steel fibers will depend on the size of the unitized construction material being fabricated. Preferably, the steel reinforcing fibers have a diameter of about 1 mm or less. The steel reinforcing fibers can be added as either straight fibers, or as bent or coiled lengths of fiber. In another example the reinforcing elements can include steel members (and more preferably, high chromium stainless steel members), and preferably having a diameter of between about 5 mm and 25 mm, depending on the size of the unitized construction material being fabricated. Such reinforcing steel members can be provided as bar material, and can thus be considered as reinforcing bar, or as rebar. (The reinforcing members can also be fabricated from non-ferrous metals and metallic alloys.) The length of the rebar material used as reinforcing steel members will depend on the overall size (length, width and depth) of unitized construction materials being fabricated. Preferably, the steel rebar material to be used for reinforcing the unitized construction materials is a high chromium stainless steel in order to resist thermo-chemical degradation during the kilning process, as well as to resist detempering of the rebar material. When placing steel rebar into the initial mixture of starting materials for the unitized construction materials being fabricated, certain considerations should be taken into account. Specifically, the linear thermal coefficient of expansion for stainless steel (about $15 \times 10^{-6}$ m/(m K)) is generally greater than the linear thermal coefficient of expansion for the aggregate (about $6 \times 10^{-6}$ m/(m K)). Thus, there is a risk that during kilning of the starting materials (for the unitized construction materials) the steel rebar will expand at such a rate (as compared to the surrounding aggregate materials) that the steel rebar will cause fracturing of the surrounding sintering aggregate material. In order to address this concern the rebar can first be coated with an envelope of expansion material which becomes plastic prior to the sintering temperature of the surrounding matrix materials within the kiln, thus allowing the rebar to expand within the envelope of the coating material, and reducing the presentation of harmful and destructive stress on the surrounding sintering aggregate. In one example the envelope of expansion material is provided as felsic sand material (e.g., a fine grade felsic sand), which can be applied over the rebar by dipping the rebar into a mixture of the felsic sand and an adhesive (such as a high viscosity grease). Preferably the rebar is provided with a coating of the expansion material which is at least about 25% of the thickness of the rebar. More preferably the rebar is provided with a coating of the expansion material which is at least about 75% to 125% of the thickness of the rebar. For example, a steel rebar having a nominal diameter of about 0.25 inches (about 6 mm) can be coated with a felsic expansion envelope material having a thickness of from about 0.125 inches (about 3 mm) to about 0.375 inches (about 9 mm). The felsic material can be potassic-feldspar powder, for example. The coating of the expansion material further extends to end portions of the rebar to accommodate longitudinal expansion of the rebar during the kilning of the unitized construction materials. The felsic expansion envelope will sinter to the surrounding aggregate during the kilning process. The reinforcing bar material can include threaded bar material, which facilitates engagement of the reinforcing bar material (i.e., rebar) with the surrounding expansion material. This arrangement is described further below and with respect to FIG. 3.

In another variation the solidified unit of the mixture of starting materials can be provided with reinforcing materials prior to placing the consolidated unit of the mixture of starting materials into the kiln. (That is, the reinforcing materials are placed into the cured starting materials following curing, and prior to kilning.) This can be accomplished by drilling (or otherwise forming) one or more holes into the solidified unit of the mixture of starting materials, injecting a grout or expansion material into the holes formed within the solidified unit of the mixture of starting materials, and thereafter placing a reinforcing bar material (or other reinforcing material) into the holes. In a further variation the reinforcing materials (or reinforcing members) can be placed into the resultant unitized construction materials (i.e., following the kilning process described above) by forming holes in the resultant unitized construction materials, filling the holes with a grout or the like, and then placing a reinforcing member into the grouted hole.

It can be desirable to add steel reinforcing bar material after kilning of the starting materials since the heat of kilning can anneal the steel in the rebar, thus reducing the tensile strength thereof. In this instance (i.e., post-kilning reinforcing using rebar) holes for the rebar (and for a grout to hold the rebar in place) can be formed in the finished unitized construction materials (as indicated above), or they can be formed in the molded starting material prior to kilning. For example, holes (for rebar material, and associated grouting material) can formed in the mixture of starting materials by: (i) drilling or water jetting holes into the cured mixture of starting material prior to kilning; (ii) placing a hole-forming bar material (such as a metal bar) into a mold prior to placing the mixture of starting materials into the mold (as described more fully below); (iii) placing a sacrificial hole-forming bar material into a mold prior to, or as part of the sequence of, placing the mixture of starting materials into the mold (as also described more fully below); and (iv) forming the holes for grout and rebar as part of an extrusion process for forming the mixture of the starting materials into a form that can be cured and then kilned.

Figure 3:
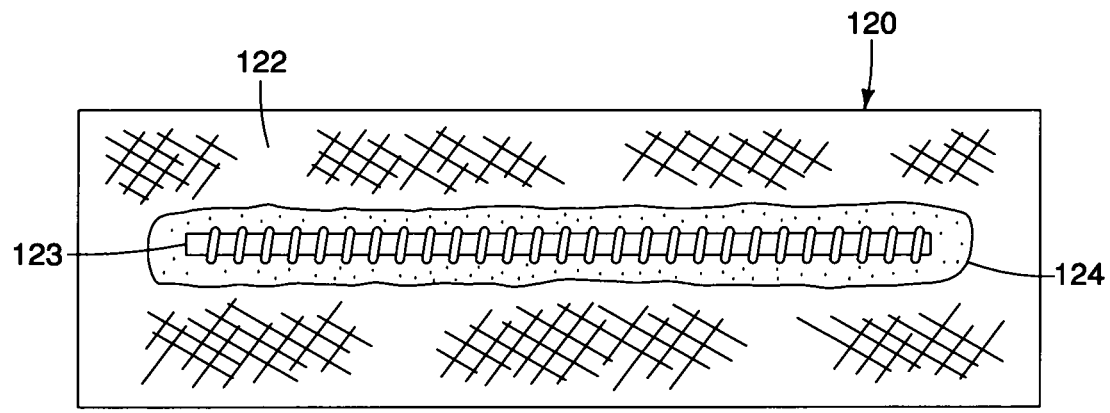
FIG. 3 is a sectional side view of a unitized formed construction material, a reinforcing bar member, and an envelope of felsic material surrounding the reinforcing bar member.

FIG. 3 is a sectional side view of a unitized formed construction material 120 which includes the mixture of starting materials 122 and a steel reinforcing bar member 123 placed within the mixture of starting materials. The steel reinforcing bar member 123 is surrounded by an enveloped of felsic coating material 124. The felsic coating material 124 becomes plastic during kilning of the unitized formed construction material 120, thus allowing the steel reinforcing bar member 123 to thermally expand without compromising the integrity of the surrounding mixture of starting materials 122. During kilning the felsic coating material 124 will sinter and bond with aggregate in the mixture of starting materials 122, and during cooling the felsic coating material 124 will adhere to the steel reinforcing bar member 123, thus forming a mechanical connection (via the felsic coating material 124) between the starting materials 122 and the reinforcing bar member 123. Preferably, the reinforcing bar member 123 includes surface features (such as threads or furls, as depicted in FIG. 3) to facilitate engagement of the felsic coating material 124 with the reinforcing bar member 123 when the unitized formed construction material 120 is cooled and the felsic coating material 124 solidifies. Further, during cooling the reinforcing bar member 123 will thermally contract, placing the unitized formed construction material 120 into a prestressed compressive state.

Figure 4:
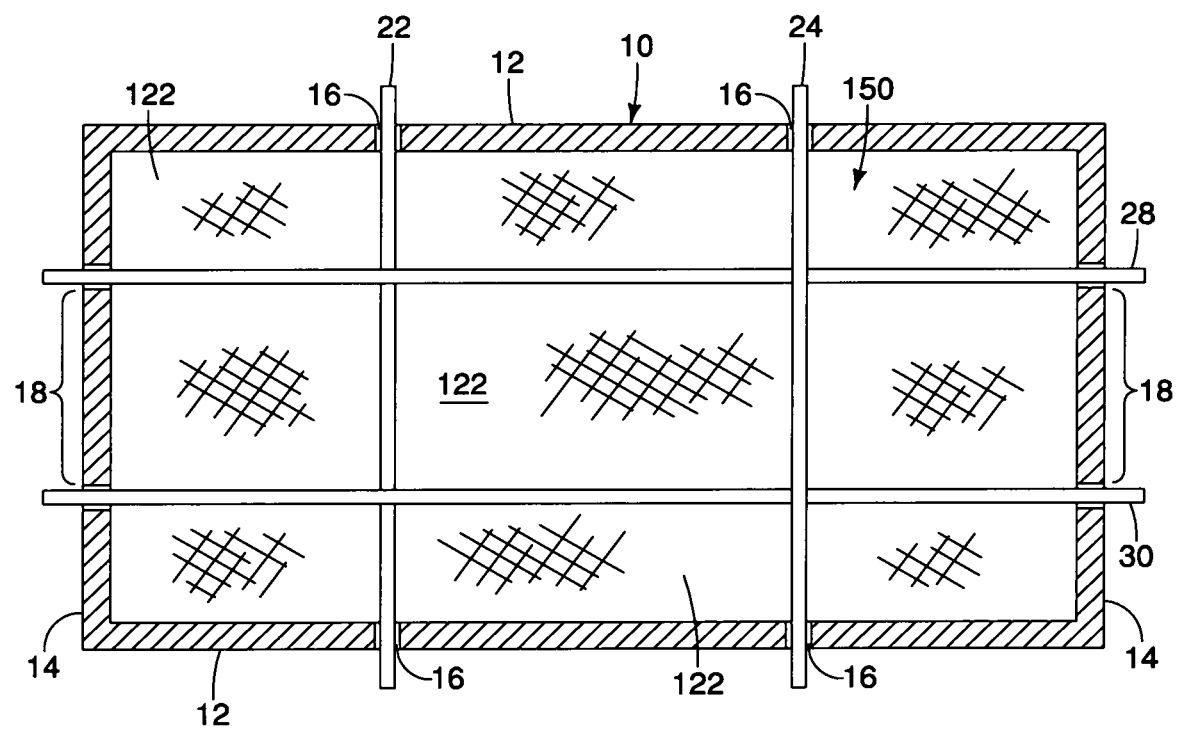
FIG. 4 is a sectional plan view of a mold which contains a mixture of the starting materials for a unitized formed construction material, and including hole-forming metal bar material used to form holes for installation of post-kilning reinforcing bar material.

FIG. 4 is a sectional plan view of a mold 10 which contains a mixture of the starting materials 122 used to form a unitized formed construction material 150. The mold 10 includes side members 12 and end members 14 which contain the mixture of the starting materials 122 within the mold. (The mold 10 also includes a bottom member, not shown, which is attached at lower edges of the side members 12 and the end members 14 in order to form the mold 10 which contains the mixture of starting materials 122.) The side members 12 of the mold 10 include side member openings 16, and the end members 14 of the mold 10 include end member openings 18. Vertical hole-forming bar members 22 and 24 are placed through the mold side member openings 16, and horizontal hole-forming bar members 28 and 30 are placed through the mold end member openings 18. (The hole-forming bar members 22, 24, 28, 30 can be placed into the mold 10, as depicted in FIG. 4, either prior to placing the mixture of starting materials 122 into the mold, or after placing the mixture of starting materials 122 into the mold (and prior to curing of the mixture of starting materials). As suggested by FIG. 4, the horizontal hole-forming bar members 28 and 30 can be spaced at an essentially equal vertical distance from the bottom member of the mold (not shown), and the vertical hole-forming bar members 22 and 24 can be staggered in vertical distance from the mold bottom member, such that the left-most vertical hole-forming bar member 22 passes beneath the horizontal hole-forming bar members 28 and 30, and the right-most vertical hole-forming bar member 24 passes above the horizontal hole-forming bar members 28 and 30. This described arrangement of the horizontal and vertical hole-forming bar members (22, 24, 28, 30) results in horizontal and vertical interleaving of the hole-forming bar members. Diagonal interleaving of the horizontal and vertical hole-forming bar members 22, 24, 28, 30 can be achieved by positioning the opposing openings 16 in the mold side members 12 at different vertical elevations, and also positioning the opposing openings 18 in the mold end members 14 at different vertical elevations. Following kilning of the mixture of starting materials 122 in the mold 10, the hole-forming bar members 22, 24, 28, 30 can be mechanically extracted from the resulting unitized formed construction material 150, resulting in openings within the unitized formed construction material that can be filled with grout and reinforcing bar material. Preferably, the hole-forming bar members (22, 24, 28, 30) are coated with a grease (such as a molybdenum grease) to facilitate extraction thereof from the kilned unitized formed construction material.

In one variation on the arrangement depicted in FIG. 4, the hole-forming bar members 22, 24, 28, 30 can be sacrificial hole-forming bar material. Sacrificial hole-forming bar material can be fabricated from components that melt, dissolve, sublimate and/or vaporize below the temperature at which the sublimation agent sublimes. Examples of components that can be used for sacrificial hole-forming bar material include biodegradable plastics, starch-based materials, and paraffin and wax based materials. Such sacrificial hole-forming bar materials can be placed into the mold 10 depicted in FIG. 4, which includes the openings 16, 18 in the respective sides 12 and ends 14 of the mold 10. In this instance (i.e., of providing the openings 16, 18 in the mold), the sacrificial hole-forming bar materials can exit via the openings during kilning of the mixture of starting materials.

In an alternative configuration, the mold 10 can be provided without the openings 16, 18 in the mold, in which instance the sacrificial hole-forming bar materials typically vaporize and exit the mixture of starting materials through permeability channels formed in the mixture of starting materials as part of the kilning process.

Pre-stressing of unitized construction materials. Following the above discussion for providing reinforcing steel bars into the starting materials (pre-kilning) for the unitized construction materials, and the differential rates of thermal coefficients of expansion between steel and the surrounding aggregate, as the kilned materials (including the rebar and the felsic expansion envelope material) are cooled, the steel rebar will contract at a rate faster than the thermal contraction of the surrounding aggregate. Thus, the thermally contracting steel rebar will tend to place the surrounding sintered aggregate into compression, thus imposing a pre-stress on resulting unitized construction material. By appropriate selection of the reinforcing material, and the thickness of the expansion envelope material, engineered pre-stress rates can be imposed on the resulting unitized construction material.

Clay-based unitized formed construction materials. In a variation on the method described above, unitized formed construction materials can be manufactured using clay as the aggregate. One source of clay can be recycled clay bricks. In this instance the starting materials include clay (preferably crushed to a particle size of fine to medium sand, as described above), a cementing agent, a sublimation agent, and water. The cementing agent is preferably Portland cement, and the sublimation agent can be molybdenum disulfide ($MoS_2$) provided in a paste form, or a copper-based solution such as copper sulfate ($CuSo_4$). The cementing agent can be provided as, for example, between about 8% and about 10% by weight of the clay, and the sublimation agent can be, for example, about 50% by weight of the cementing agent. The water can be mixed with the cementing agent, and then the paste-form of the sublimation agent can be added and mixed with the water-cement mixture. The clay aggregate can then be mixed with the water-cement-sublimation-agent mixture. The resulting mixture of the starting materials can then be formed in molds (as described above), or is preferably formed by an extrusion process (also described above). The resulting formed mixture of the starting materials is then dried and cured (which can be performed at ambient conditions), and afterwards kilned. The preferred kilning temperature when clay is used as the aggregate is about 1177° C. (about 2150° F.) when using molybdenum disulfide as a sublimation agent), and about 1120° C. (about 2050° F.) when using copper sulfate as a sublimation-reaction agent.

I have discovered that adding cementing agent and sublimation agent to clay aggregate will reduce drying time for the formed unitized formed construction materials prior to kilning. Further, the addition of the sublimation agent reduces the amount of calcium oxide present in the post-kilned clay-based unitized formed construction material, due to the reaction of the calcium oxide (CaO) with the molybdenum disulfide ($MoS_2$) sublimation agent (resulting in calcium molybdenum oxide ($CaMoO_4$), which sublimates during kilning, as discussed above). The reaction also produces excess calcium, which can then react with silicon in the clay to form calcium silicate ($Ca_2SiO_4$). The removal of calcium oxide makes the brick-like unitized formed construction material more chemically resistant to components such as ice melts, and the generation of calcium silicates in the end product can increase fire resistance and heat insulative properties.

Method for manufacturing unitized formed mineral-based construction materials. As described above, the present disclosure provides for a method for manufacturing (i.e., making) unitized formed mineral-based construction materials. The method can include the following steps: (i) providing starting materials comprising an aggregate, a cementing agent, a sublimation agent and water; (ii) mixing the starting materials with one another to achieve a mixture of the starting materials; (iii) placing the mixture of the starting materials into a form (or mold); (iv) curing the mixture of starting materials in the form for a period of time selected to allow the mixture of starting materials to become a solidified unit of the mixture of starting materials, the solidified unit of the mixture of starting materials being defined by a minimum dimension of thickness, length, width or diameter; (v) removing the solidified unit of the mixture of starting materials from the form; (vi) placing the solidified unit of the mixture of starting materials into a kiln; (vii) heating the kiln containing the solidified unit of the mixture of starting materials to a processing temperature of between about 1000° C. and about 1350° C. and maintaining the kiln at the processing temperature for a period of time of between about 10 minutes and about 60 minutes per centimeter of the minimum dimension of the solidified unit of the mixture of starting materials; and (viii) removing the solidified unit of the mixture of starting materials from the kiln. It will be appreciated that the process as just described can include additional and alternate steps to those described, as well as variations on the recited steps. For example, in certain instances the solidified unit of the mixture of starting materials do not need to be removed from the form prior to placing the solidified unit of the mixture of starting materials into the kiln—i.e., the form containing the solidified unit of the mixture of starting materials can be placed directly into the kiln.)

Figure 2A:
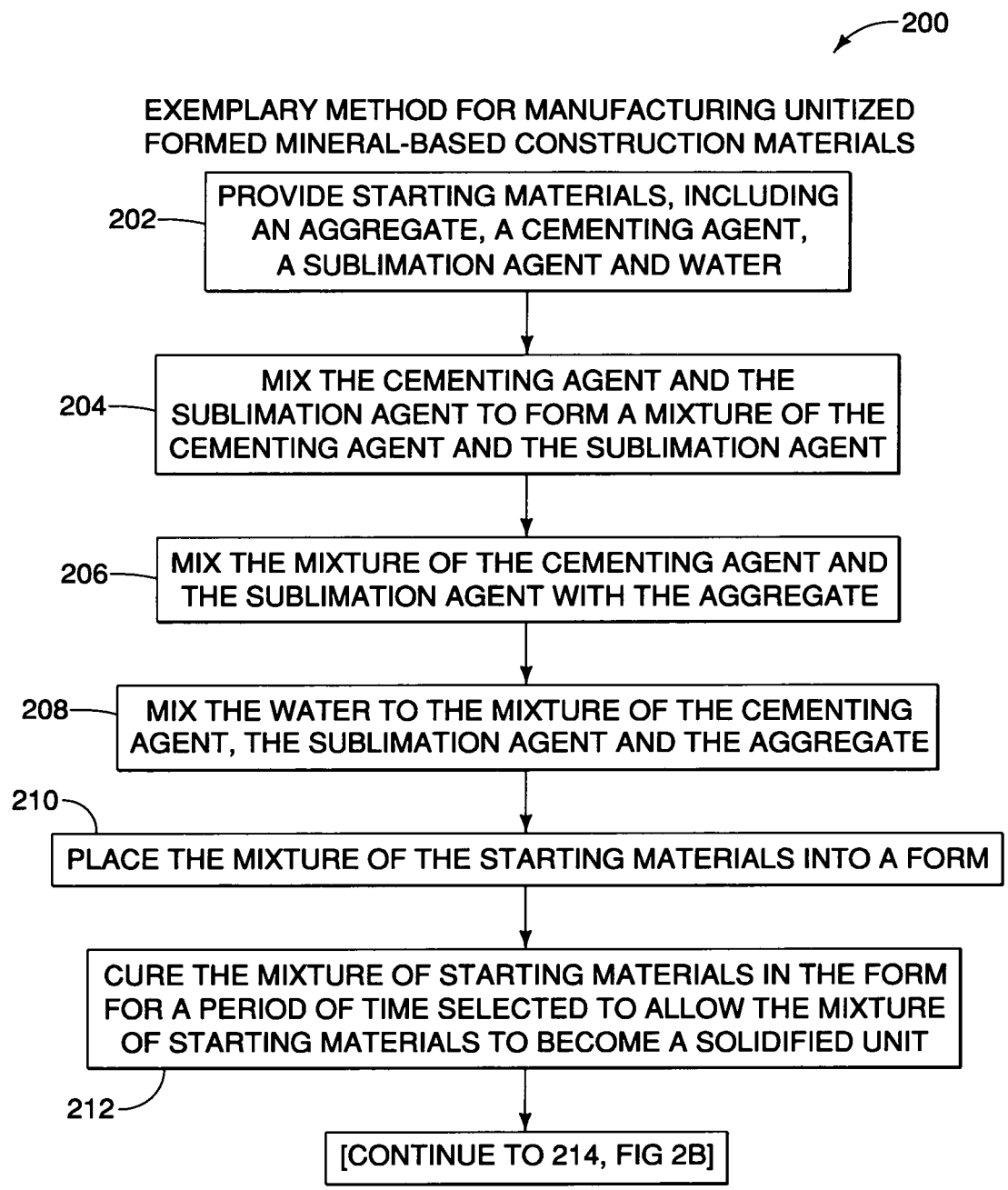
FIG. 2A is the first part of a two-part flowchart (which is continued on FIG. 2B) of an exemplary method for manufacturing a unitized formed construction material, according to the present disclosure.
Figure 2B:
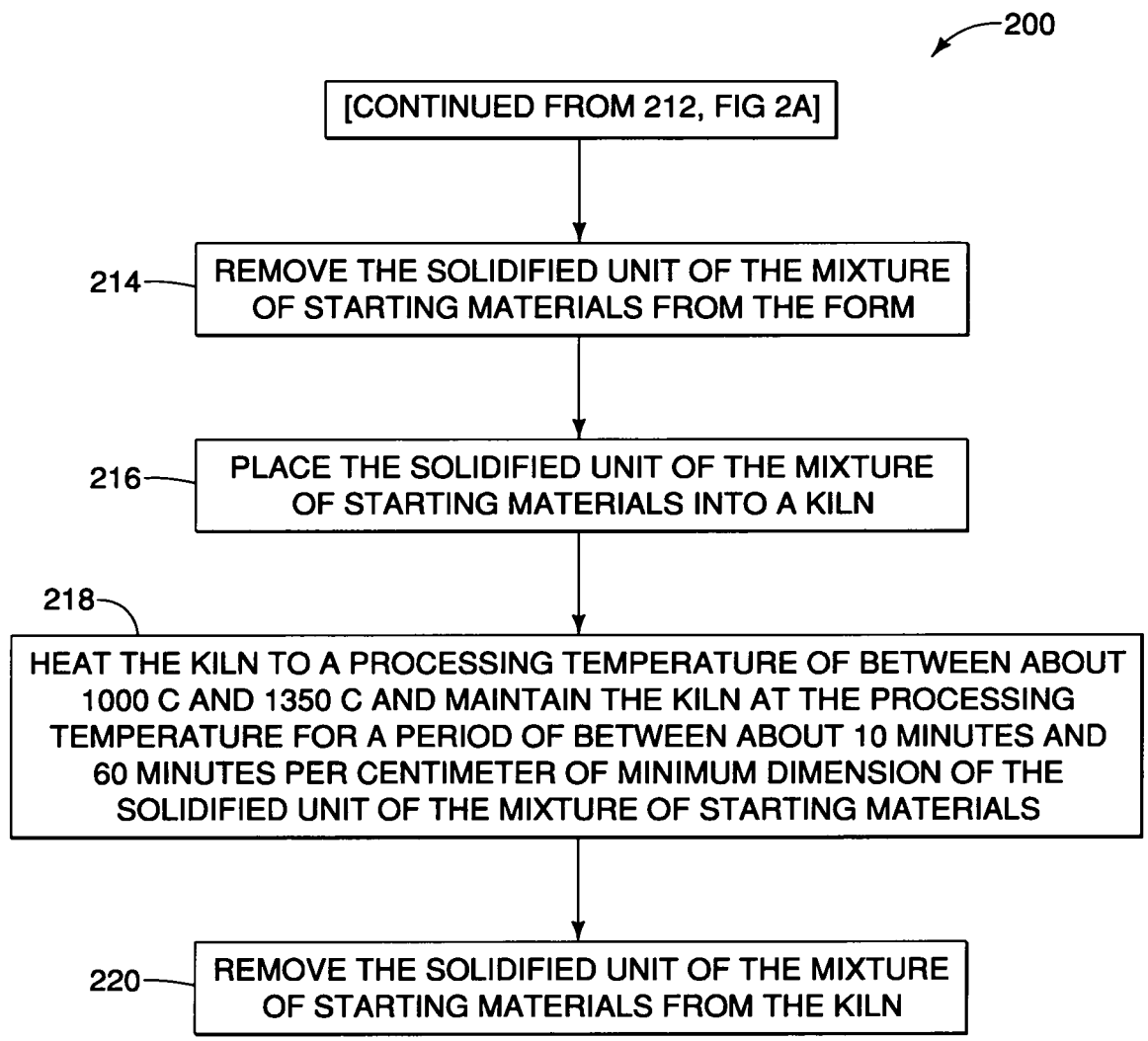
FIG. 2B is the second part of a two-part flowchart (which is a continuation from FIG. 2A) of an exemplary method for manufacturing a unitized formed construction material, according to the present disclosure.

FIGS. 2A and 2B together provide a flowchart 200 depicting an exemplary method for manufacturing unitized formed mineral-based construction materials according to at least one method provided for herein. (It will be appreciated that the flowchart of FIGS. 2A and 2B depict only one example of a method for manufacturing unitized formed mineral-based construction materials according to the methods provided for herein, and that the method depicted in FIGS. 2A and 2B can include fewer steps than are indicated, as well as additional steps not shown). In the exemplary method depicted in the flowchart 200 of FIGS. 2A and 2B for manufacturing unitized formed mineral-based construction materials, the process begins at step 202 (FIG. 2A) by providing starting materials that include an aggregate, a cementing agent, a sublimation agent, and water. At step 204 the cementing agent and the sublimation agent are mixed together to form a mixture of the cementing agent and the sublimation agent. At step 206 the mixture of the cementing agent and the sublimation agent are mixed with the aggregate, and then at step 208 the water is mixed into the mixture of the cementing agent, the sublimation agent and the aggregate. (It will be appreciated that the steps (i.e., steps 204-208) of mixing the aggregate, the cementing agent, the sublimation agent, and the water can alternately be performed in various sequences and/or combinations, but the overall objective is to mix the starting materials into a homogeneous mixture so that when the cementing agent cures the resulting solidified unit (see step 212) is an essentially homogeneous unit.) Following mixing of the starting materials, at step 210 the mixture of the starting materials is placed into a form. At step 212 the mixture of the starting materials in the form is cured for a period of time selected to allow the mixture of the starting materials to become a solidified unit (i.e., capable of being removed from the form and retaining the shape of the form). Then at step 214 (FIG. 2B) the solidified unit (i.e., cured product) of the mixture of the starting material is removed from the form, and at step 216 the solidified unit is placed into a kiln. (It will be appreciated that the step of removing the solidified unit from the form, i.e., step 214, is optional, and that the cured starting materials can be placed into the kiln (at step 216) while still in the form.) Once the solidified unit of the starting materials is placed into the kiln, then at step 218 the kiln is heated to a processing temperature of between about 1000° C. and about 1350° C. and maintained at the processing temperature for a period of between about 10 minutes and 60 minutes per centimeter of minimum dimension of the solidified unit of the mixture of starting materials. Following kilning of the solidified unit of the starting materials at the processing temperature for the designated period of time, then at step 220 the kilned solidified unit of the mixture of starting materials is removed from the kiln as the unitized formed mineral-based construction material.

Alternative Method for Manufacturing Unitized Formed Mineral-Based Construction Materials. Another method for manufacturing unitized formed mineral-based construction material is similar to the first method described above, except that a separate sublimation agent is not used as a separate starting material. Rather, I have discovered that Portland cement, as well as micaceous arkosic sand, contain a certain amount of metal sulfides (including metal disulfides—I will use the term metal sulfides herein to cover all forms of metal and alkyl sulfides—and also including silicate and oxide based metal sulfides). These metal sulfides in the cement, along with metal sulfides on the surfaces (at least) of the aggregate, perform the function of a sublimation agent. That is, at a sufficiently high kilning temperature (i.e., about 1120° C. to about 1135° C. (about 2050° F. to about 2075° F.)) these metal sulfides vaporize and/or sublimate, leaving porosity not only on the surfaces (at least) of the aggregate, but also between grains of the cement and the aggregate. This porosity not only provides for liquid permeability in the resulting unitized construction material, but also reduces density (and thus weight) of the unitized construction material. In addition, the kilning temperature is selected to cause sintering of grains of the aggregate to one another, thus providing tensile and compressive strength to the resulting unitized construction material. Further, as described herein, the sublimation process of the metal sulfides from the cement and the aggregate is the result of a chemical process which tends to remove calcium components (such as calcium oxide), thus providing for increased resistance to chemical breakdown due to exposure to materials such as ice melters and the like. More specifically, one such chemical reaction which occurs during kilning of the starting materials is as follows: $CaO+MS_x+O_2 \rightarrow CaMO_x=SO_x$ (where "M" is used to indicate a metal, including alkyl metals such as lithium, sodium, manganese, and potassium; $MS_x$ thus designates any metal sulfide component thereof).

In this variation the preferred aggregate is micaceous quartzite which can decompose to feldspar (or arkose-based feldspar), and more preferably one of these components having about 6% or more of potassium. The aggregate also preferably includes about 50% of potassic feldspar (or components which will become potassic feldspar when subjected to a kilning temperature of about 1120° C.), about 30% of quartz (SiO$_4$), and about 20% of non-organic volatile components which evolve (i.e., sublime and/or vaporize) at a kilning temperature of between about 1120° C. and about 1135° C. The aggregate is preferably crushed and/or ground to a mean particle size of fine sand, and more particularly to a size where about 80% or more of the particles will pass through a 200 mesh (about 0.074 mm) screen. Further, the aggregate is preferably not pre-processed by kilning (as described above with respect to methods for making porous mineral based granular material), thus leaving metal sulfides on the surfaces of the particles (granules) which can sublimate and/or vaporize during kilning of the starting materials (as described in the paragraph above). I have also determined that micaceous quartzite, sericitized granite and/or seriticized rhyolite which is processed by crushing, grinding, pulverizing, etc. to the preferred particle size tends to result in somewhat elongate particles having a ratio of depth (minimum particle dimension) to length (maximum particle dimension) of about 1:3. (The width of such particles tends to be greater than the depth, and less than the length.) I have also determined that once the processed aggregate is mixed with the cementing agent, the aggregate particles tend to align with one another in a first dimension which is parallel to the major length dimension of the aggregate particles, with particles of the cementing agent being generally interspersed between the aggregate particles.

The cementing agent used in this alternative method is preferably Portland cement. The amount of cementing agent to be used is preferably less than about 10% (by weight) of the total mass of the starting materials, and more preferably between about 3% and 7% (by weight) of the total mass of the starting materials (including the water component thereof). It will be appreciated that the amount of cementing agent required to form the unitized formed mineral-based construction materials according to this method (i.e., less than about 10% by weight) is less than the amount of cement typically used to form concrete (typically, about 10 to 15 percent cement, 60 to 75 percent aggregate and 15 to 20 percent water).

In preparing the starting materials for unitized formed mineral-based construction materials manufactured according to the current alternative method (i.e., no separate sublimation agent is added to the starting materials), the aggregate and the cementing agent can be first mixed with one another to obtain a generally homogeneous distribution of the particles. Then the water can be added and mixed with the mixture of the aggregate and the cementing agent. (The amount of water to be added is as described above with respect to previously described methods for forming the unitized construction materials of the present disclosure). The resulting mixture of aggregate, cementing-agent and water can then be formed by placing the mixture into molds, or extruded (as described herein), to achieve the desired form of the end product. The formed mixture of the starting materials are then cured (in accordance with procedures described herein above) to allow the cementing agent to undergo the hydration process which results in a solidified unit of the starting materials, which can then be placed into a kiln.

The mixed, formed and cured starting materials are then placed into a kiln and subjected to a kilning temperature of between about 1100° C. and about 1135° C. (about 2025° F. and about 2075° F.) for a period of time selected to allow micaceous components in the aggregate to evolve to felspathic components, and then for the felspathic components be altered to remove metal sulfides present in the aggregate and cement, and also allow removal and/or conversion of calcium components from the cement into less reactive compounds (all as described above). The temperature regimen (i.e., temperature increase rate in the kiln, processing temperature, and processing time) can all be performed according to the parameters described above with respect to methods previously described herein for the manufacture of mineral-based unitized construction materials.

As described above, the present disclosure provides for a method for manufacturing (i.e., making) unitized formed mineral-based construction materials which includes the following steps: (i) providing starting materials comprising an aggregate, a cementing agent, and water; (ii) mixing the starting materials with one another to achieve a mixture of the starting materials; (iii) placing the mixture of the starting materials into a form (or mold); (iv) curing the mixture of starting materials in the form for a period of time selected to allow the mixture of starting materials to become a solidified unit of the mixture of starting materials, the solidified unit of the mixture of starting materials being defined by a minimum dimension of thickness, length, width or diameter; (v) removing the consolidated unit of the mixture of starting materials from the form; (vi) placing the solidified unit of the mixture of starting materials into a kiln; (vii) heating the kiln containing the solidified unit of the mixture of starting materials to a processing temperature of between about 1100° C. and about 1135° C. and maintaining the kiln at the processing temperature for a period of time of between about 10 minutes and 60 minutes per centimeter of the minimum dimension of the consolidated unit of the mixture of starting materials; and (viii) removing the solidified unit of the mixture of starting materials from the kiln. (It will be appreciated that the process as just described can include additional and alternate steps described herein, as well as variations on the recited steps.)

Manufacture of Porous Unitized Construction Materials from Native Micaceous-Containing Rock.

In yet another embodiment I have discovered that porous unitized construction materials can be fabricated from native micaceous-containing rock. In this embodiment units of the construction materials are first cut from native micaceous-containing rock. Preferably, the native micaceous-containing rock contains at least 30% of micaceous material, and 30% of quartzitic material. Sericitized rhyolites and granites can also be used. The units of the construction materials can be cut from the native rock using known cutting processes, including water jet cutting, saw cutting, and laser cutting. Once cut to the desired dimensions and shape, the cut units of the native micaceous-containing rock can be placed into a kiln and subjected to a temperature of between about 1000° C. and about 1200° C. for a period of time of between about 6 minutes and 15 minutes per centimeter of the maximum dimension of the cut units. During this kilning process micaceous components within the cut units of the native rock will evolve to felspathic components, and metal sulfides and other components will be sublimated and/or vaporized, thus creating porous openings and permeable channels within the cut units of the native rock. The resulting (i.e., post-kilned) units will be unitized construction materials having high strength and high porosity.

Catalytic Sieves, and Manufacture Thereof.

As described immediately above, porous permeable unitized formed mineral-based construction materials can be manufactured according to the methods provided for herein. These materials can provide for a high rate of base fluid passage there through, and in particular, liquid water and other liquid solvents, as well as vaporized solvents, and including reactive components entrained (or dissolved) therein. Since a large volume of fluid can be passed through the unitized formed materials (either via gravity flow or under induced pressure), this provides a useful medium for a catalytic sieve—that is, a formed unit through which fluid can be passed, and in so doing is used to expose the reactive components included in the base fluid to react with the catalytic compounds supported within the matrix of the unitized formed materials. More specifically, the porous, permeable unitized formed materials provided for herein can include metals which can be used to catalyze chemical reactions of reactive components carried by a base fluid passing through the unitized formed materials. These metals can be provided as part of the sublimation agent, as part of the aggregate, as a supplemental component (e.g., as an added metal oxide or an added metal sulfate), or as a combination thereof. The catalytic metal(s) is/are selected from the group of metals indicated in the periodic table of elements as transition metals—i.e., those elements in the d-block of the periodic table (which includes groups 3 to 12 on the periodic table) as well as the f-block lanthanide and actinide series (i.e., the so-called "inner transition metals"). Depending on the chemical components to be catalyzed, in some instances the included catalytic metal can be an alkali metal (such as lithium, or potassium, for example). A particularly useful source of aggregate which can be used in the formulation of the catalytic sieves provided for herein, and which can provide the desirable catalytic metals, are mine tailings. As described above, mine tailings can be used as aggregate in the formation of the unitized formed materials, and surplus sublimation agent renders the metals in the aggregate chemically inert. However, while the metals are chemically inert (i.e., they do not react to form new compounds), they are still electrically active and can thus act as activating catalysts (e.g., for breaking chemical bonds in fluids and/or gasses). Mine tailings can be specifically selected for their catalytic metal content and added to other aggregate materials (such as sand and gravel). Further, the specific metals to be added to the mixture of materials used to manufacture the catalytic sieve can be selected for a particular purpose. For example, when it is desirable to break down molecular nitrogen entrained within liquid water passing through the catalytic sieve, then it is desirable to include zinc (and/or other transition metals) as a catalytic metal in the formulation of the unitized formed catalytic sieve. Once molecular nitrogen is catalyzed to break into atomic nitrogen (by the metals in the catalytic sieve), then the atomic nitrogen is free to react with other components present in, or flowing through, the catalytic sieve to thus form new compounds (such as ammonia, amino acids, etc.). The method for manufacturing a catalytic sieve according to the present disclosure is generally similar to the method described for manufacturing a porous, permeable unitized formed construction material, as described above, with the exception that the materials provided include at least 2% (by weight) of a transition metal to act as a catalyst (as described above). One exemplary method for forming a catalytic sieve is as follows:

Provide starting materials including an aggregate, a cementing agent, a sublimation agent and water (the sublimation agent selected from the group consisting of molybdenum disulfide, tungsten disulfide, vanadium disulfide, copper sulfate, and combinations thereof, and being provided in an amount of between 25% and 50% by weight of the cementing agent; the aggregate containing at least 2% by weight of at least one transition metal).

Then mixing the starting materials with one another to achieve a mixture of the starting materials.

After mixing, placing the mixture of the starting materials into a form and curing the mixture of starting materials in the form for a period of time selected to allow the mixture of starting materials to become a solidified unit of the mixture of starting materials (the solidified unit of the mixture of starting materials being defined by a minimum dimension of thickness, length, and one of width or diameter).

Thereafter placing the solidified unit of the mixture of starting materials into a kiln, and heating the kiln containing the solidified unit of the mixture of starting materials to a processing temperature of between 1115° C. and 1350° C. and maintaining the kiln at the processing temperature for a period of time of between 10 minutes and 60 minutes per centimeter of the minimum dimension of the consolidated unit of the mixture of starting materials.

Finally, removing the solidified unit of the mixture of starting materials from the kiln.

Examples of Uses for Unitized Construction Materials

The present disclosure also provides for unitized formed mineral-based construction materials manufactured according to the methods provided for herein. When the unitized construction materials provided for herein are manufactured with high porosity and permeability, these materials can be used in the following exemplary applications: (i) as pavers for walkways, roads, or any ground surface area where it is desirable to provide a surface covering which provides for water permeability and water retention; (ii) as roofing tiles to enable water to move through the tiles to a water runoff containment means; (iii) as flooring tiles to enable liquids imposed on the flooring tiles to move through the tiles to a liquid runoff containment means; (iv) as a leach pad for a mineral leaching process; and (v) as a liquid filtration means to remove solids from liquids (e.g., to remove solids from water). When the unitized construction materials provided for herein are manufactured with low porosity and low permeability, these materials can be used as structural elements (such as beams and other structural elements) and/or architectural units (such as facing bricks or as pavers). Further, the unitized construction materials provided for herein can be provided with high porosity (coupled with high or low permeability), and thus used as wall elements (or other construction elements) which are highly receptive to applied materials (such as paint or the like), as well as being used as light weight structural members.

I have further discovered that when the unitized construction materials provided for herein are manufactured to be liquid permeable (as provided for by designed-in liquid permeability), the movement of liquids there-through can be inhibited by surface tension of the liquids at the surfaces of the unitized construction materials. For example, when a paver formed as a unitized construction material provided for herein is designed with high permeability, a liquid presented on an upper surface of such a unitized construction material will generally not pass from a corresponding lower surface unless a means is provided to break surface tension of the liquid at the lower surface. One means for breaking surface tension of the liquid at the lower surface of the unitized construction material is by placing the lower surface of the unitized construction material into contact with a fluid conductive material that will facilitate movement of liquids within the unitized construction material into a substrate material. Examples of such a fluid conductive material include (i) the porous mineral-based granular material provided for herein above; and (ii) a geotextile fabric. Examples of a substrate material include: (i) the porous mineral-based granular material provided for herein above; and (ii) an aggregate material such as sand and/or gravel. Another means for breaking surface tension of the liquid at the lower surface of the unitized construction material is by placing the unitized construction material at an angle (relative to a horizontal plane), or by forming angled divots on the lower surface of the unitized construction material, which will promote movement of the liquid across the lower surface of the unitized construction material, thus breaking surface tension of the liquid at the lower surface of the unitized construction material and allowing the liquid to move through the liquid permeable unitized construction material.

Water extraction inserts in low permeability surface coverings. Many surface coverings such as concrete (e.g., sidewalks, slabs, etc.), asphalt (e.g., streets) and bricks (e.g., courtyards, etc.) are characterized by generally very low permeability to water and other fluids. An important consideration in many such surface coverings is the ability to remove water (such as rainwater) from the surface in a quick manner. To this end, most such surface coverings are installed with a slope which drains runoff to a water collection point. A common example is draining streets and sidewalks to storm drains. As indicate above, this storm water can be difficult to manage using existing sewage treatment facilities, or may require an entirely separate storm water treatment facility. A preferred solution to managing the storm water runoff is for the storm water to be conducted into the subgrade beneath the surface. I have discovered a method for managing storm water (and other liquid) runoff from a generally impermeable grade surface which results in the water being conducted into a subgrade zone beneath the grade surface. This method is particularly useful for retrofitting existing impermeable grade surfaces. The method includes inserting a zone of permeable tiles within, and through, the impermeable surface covering. When the method is used for retrofitting existing impermeable grade surfaces, then the existing grade surface can be cut (e.g., using a concrete saw, water cutting, etc.) to create an opening for inserting the zone of permeable tiles. When the method is used in new construction, then the permeable tiles can be laid adjacent to an edge in the impermeable surface covering. The permeable tiles can be installed after new construction by providing block-outs for the permeable tiles during construction. Examples of the method will be described below with respect to FIGS. 5 through 8. Preferably, the permeable tiles are arranged in a line across, or at an edge of, the impermeable surface covering, and which is arranged to intercept liquid runoff from the surface covering. The permeable tiles can be brick-shaped, or other shapes as dictated by a particular application. The inclusion of one or more zones of permeable tiles within a surface covering is most advantageous when the permeable tiles, and indeed the surface covering as a whole, is located over a subgrade bed of permeable material which can hold a volume of water. Common forms of subgrade fill which can hold water include aggregate such as gravel, sand and crushed rock. The porous mineral-based sand provided for hereinabove is a particularly useful form of subsurface fill material that can be used in this particular method, due not only to the large volume of water that can be accommodated by the pores, but also due to the fact that the pores tends to hold the water within the grains of the granular material so that the water is released slowly therefrom. The frequency of the zones of permeable tiles (if more than one line or zone is to be applied to a particular area), and the kind and volume of subgrade fill material to be used, can be selected based on known historical local storm data, and on the level of water management desired.

Figure 5:
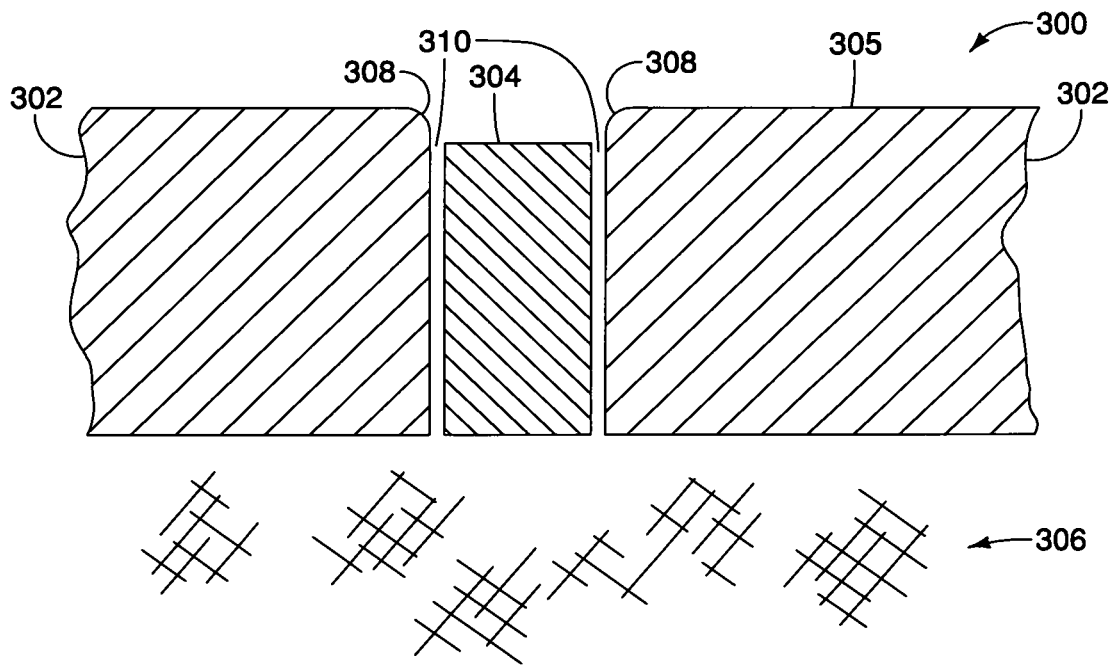
FIG. 5 is a partial side sectional view depicting a surface covering system that includes permeable tiles inserted in and through a generally impermeable surface covering.

Turning to FIG. 5, a surface covering system 300 is depicted in a partial side sectional view. The surface covering system 300 includes a generally impermeable surface covering 302 (such as concrete, pavement or paving tiles) and a permeable tile 304 is inserted into a gap (not numbered) which is formed in and through the generally impermeable surface covering 302. (In this instance, the term "generally impermeable" means that the surface covering 302 has a permeability to water that is no more than 30% of the permeability of the permeable tile 304.) The generally impermeable surface covering 302 and the permeable tile 304 are supported on a subgrade bed of fill material 306. The permeable tile 304 can be recessed below the upper surface 305 of the generally impermeable surface covering 302 in order to reduce wear on the tile 304. Further, the edges of the generally impermeable surface covering 302 can be provided with rounded edges 308 to resist chipping and spalling of the surface covering 302 near the permeable tile 304. A gap 310 can be provided on either side of the permeable tile 304 to facilitate installation of the tile 304 into the opening in the surface covering 302. The gap 310 can be filled with sand or grout in order to hold the permeable tile 304 in place between the portions of the generally impermeable surface covering 302 on either side of the permeable tile 304. The installation depicted in FIG. 5 is particularly useful when the permeable tiles 304 are inserted into a preexisting generally impermeable surface covering 302 (as for example, when the opening for the permeable tiles 304 is formed in the generally impermeable surface covering 302 after the surface covering has been put in place).

Figure 6:
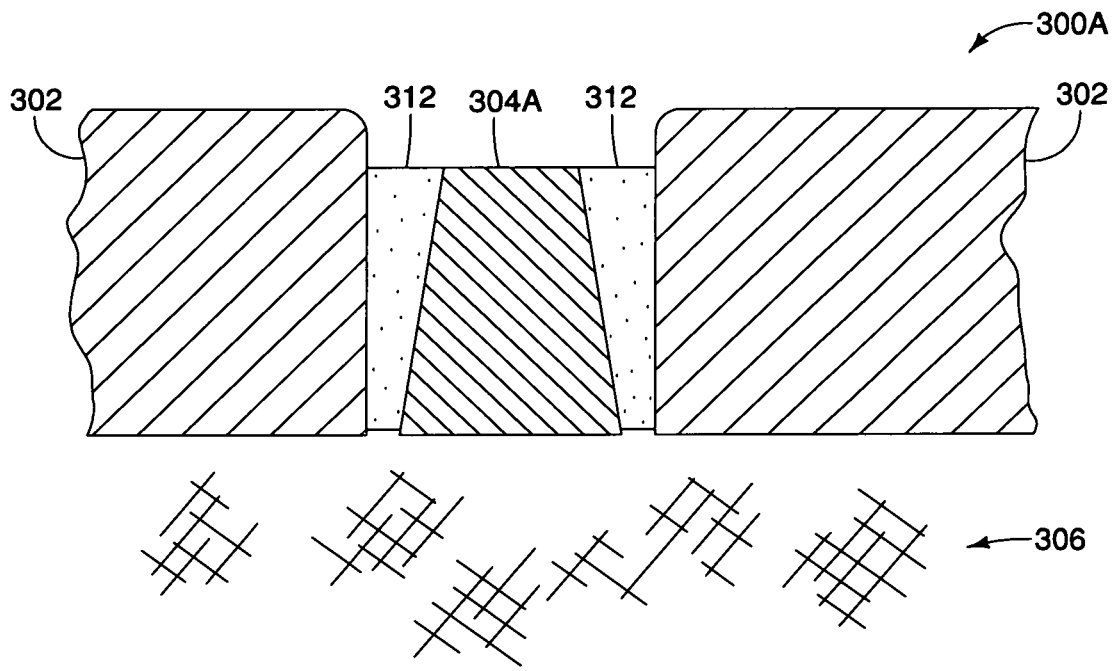
FIGS. 6 and 7 are partial side sectional views depicting variations of the surface covering system of FIG. 5.

FIG. 6 is a partial side sectional view of a surface covering system 300A, which generally corresponds to the arrangement depicted in FIG. 5, but with the following differences. In FIG. 6 the permeable tile 304A is wedge-shaped, and a sand or other fill material 312 is provided in the gap (310 of FIG. 5) between the sides of the tile 304A and the sides of the opening in and through the generally impermeable surface covering 302. In the arrangement depicted in FIG. 6 the wedge-shape of the permeable tile 304A, and the fill material 312, assist in holding the tile 304A in place over the subgrade bed of fill material 306. In FIG. 6 the angle of the wedge-shape of the permeable tile 304A, and the width of the gap (310 of FIG. 5), are exaggerated for purposes of illustration.

Figure 7:
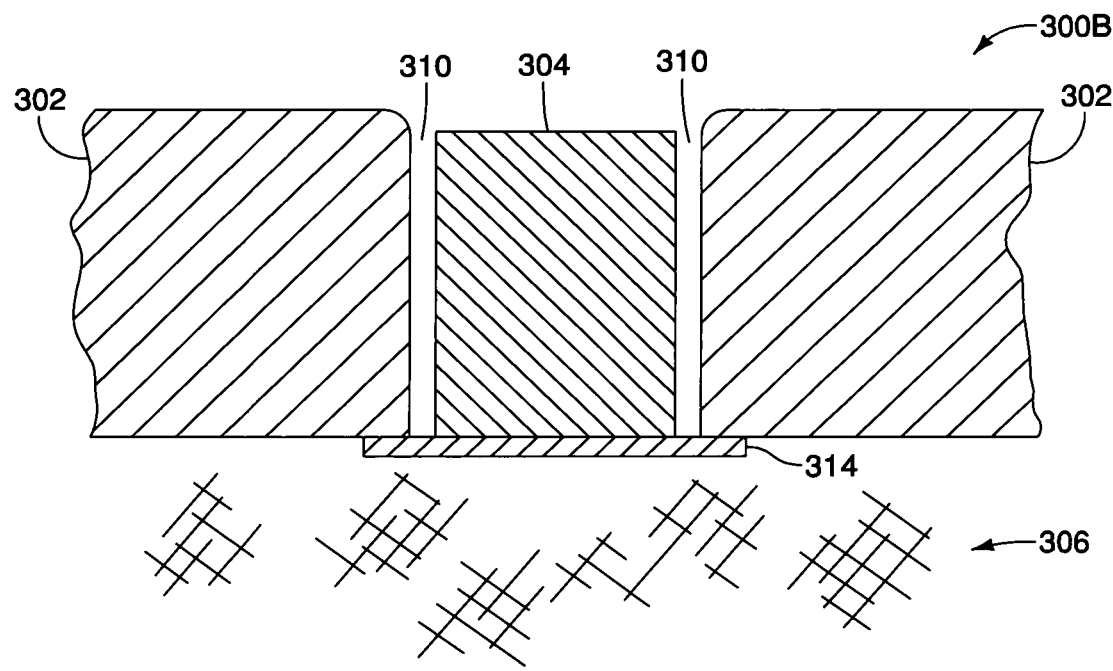

FIG. 7 is a partial side sectional view of a surface covering system 300B, which is similar to the surface covering system 300 depicted in FIG. 5. In FIG. 7 a generally rigid geotextile fabric 314 is placed beneath the permeable tile 304, and immediately on top of the subgrade fill material 306. The geotextile fabric 314 is water permeable, but is also selected to prevent fine material (such as silt and dirt) from passing through the geotextile fabric 314 and into the subgrade fill material 306. This will reduce the rate at which such fines can infiltrate through the gap 310 (as well as through the permeable tile 304) and clog the subgrade fill material 306. As depicted, the geotextile fabric 314 is preferably installed so as to partially extend under the edges of the generally impermeable surface covering 302 which are adjacent to the permeable tile 304. In one variation the geotextile fabric 314 can be attached to the permeable tile 304 prior to installation of the tile 304. One method for attaching the geotextile fabric 314 to the permeable tile 304 is by stitch-gluing, which reduces the presence of glue on the lower surface of the tile 304 (appreciating that glue on surfaces of the permeable tile can inhibit inflow of liquid into and from the tile). Further, the gaps 310 can be filled with a fill material (e.g., 312 of FIG. 6, described above), in which case it is intended that the fill material in the gaps will over time trap dirt, silt and other materials, thus making the fill material generally impermeable to water flow. This will consequently direct water flow (including any entrained solids) to the upper surface (not numbered) of the permeable tile 304, allowing water to move through the generally microscopic pores of the permeable tile, while leaving generally macroscopic solids on the upper surface of the tile. This will prevent the migration of macroscopic solids into the subgrade material 306, thus reducing the likelihood of the subgrade material becoming clogged over time. Any microscopic solids in the water flowing to the upper surface of the tiles 304 will thus tend to migrate through the permeable tiles, as well as the subgrade material 306, thus ensuring a long fluid-flow life for both the permeable tiles 304 and the subgrade fill material 306. Further, holes or other openings can be formed in the geotextile fabric 314 where the geotextile fabric is in contact with, or is in close proximity to, the lower surface (not numbered) of the permeable tile 304, to thus ensure that the geotextile fabric does not present a barrier to water flow from the permeable tile 304 into the substrate 306. Also, the geotextile fabric 314 can be attached to the permeable tiles 304 by a continuous, water impermeable glue strip at the outer edges of the lower surface (not numbered) of the tiles 304 in order to reduce initial flow of macroscopic entrained solids passing through the gap filling material (312, FIG. 6) and subsequently passing into the portion of the geotextile fabric which is directly beneath the lower surface (not numbered) of the permeable tile. In general, the objective is to provide a system which provides a seal to migration of macroscopic solids into the subgrade material 306, and this can be accomplished by way of the gap filling material (312, FIG. 6) becoming clogged during a period of initial use, the impermeability of the surface covering 302, and the microscopic porosity of the permeable tiles 304.

Figure 8:
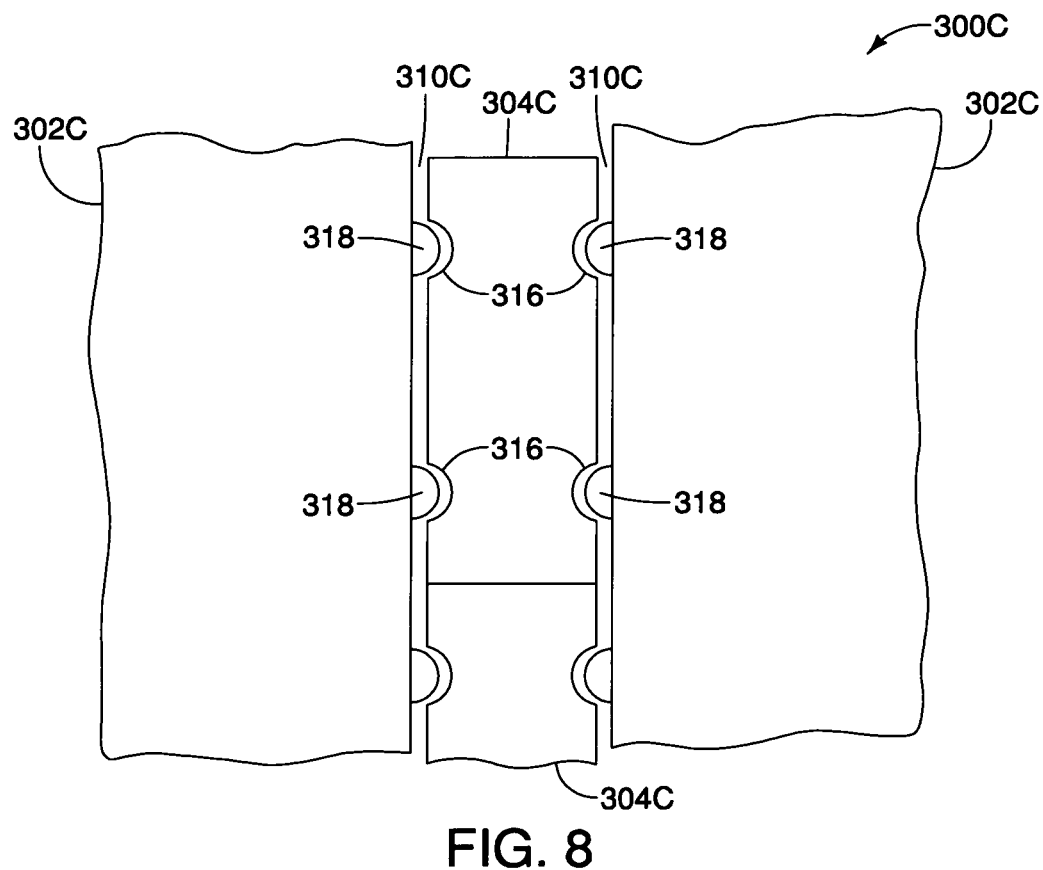
FIG. 8 is a plan view depicting a variation of the surface covering system of FIG. 5, and including permeable tiles that interlock with the adjacent generally impermeable surface covering.

FIG. 8 is a plan view of a surface covering system 300C, which is similar to the surface covering system 300 depicted in FIG. 5. In FIG. 8 the permeable tiles 304C are provided with indentations 316 which are configured to receive projections 318 formed on the edges of the generally impermeable surface covering 302C. The indentations 316 and the projections 318 act together as a locking system to lock the tiles 304C into horizontal position with respect to the impermeable surface covering 302C. The arrangement depicted in FIG. 8 is particularly useful when the impermeable surface covering 302C proximate the permeable tiles 304C is formed from tiles or other materials which allow for the projections 318 to be formed in relatively precise positions to ensure engagement with the indentations 316 in the permeable tiles 304C. It will be appreciated that the projections 318 can be formed on the permeable tiles 304C, and the indentations 316 formed on the edges of the impermeable surface covering 302C. FIG. 8 also depicts a small gap 310C between the edges of the permeable tiles 304C and the edges of the impermeable surface covering 302C. The gap 310C allows for accommodation of slight variances in the relative positions of the indentations 316 and the projections 318 with respect to one another. The gaps 310C can be later filled with sand or other filling material in the manner described above with respect to FIG. 6. It will also be appreciated that the permeable tiles 304C can be provided with the geotextile fabric 314 described above with respect to FIG. 7.

Figure 9:
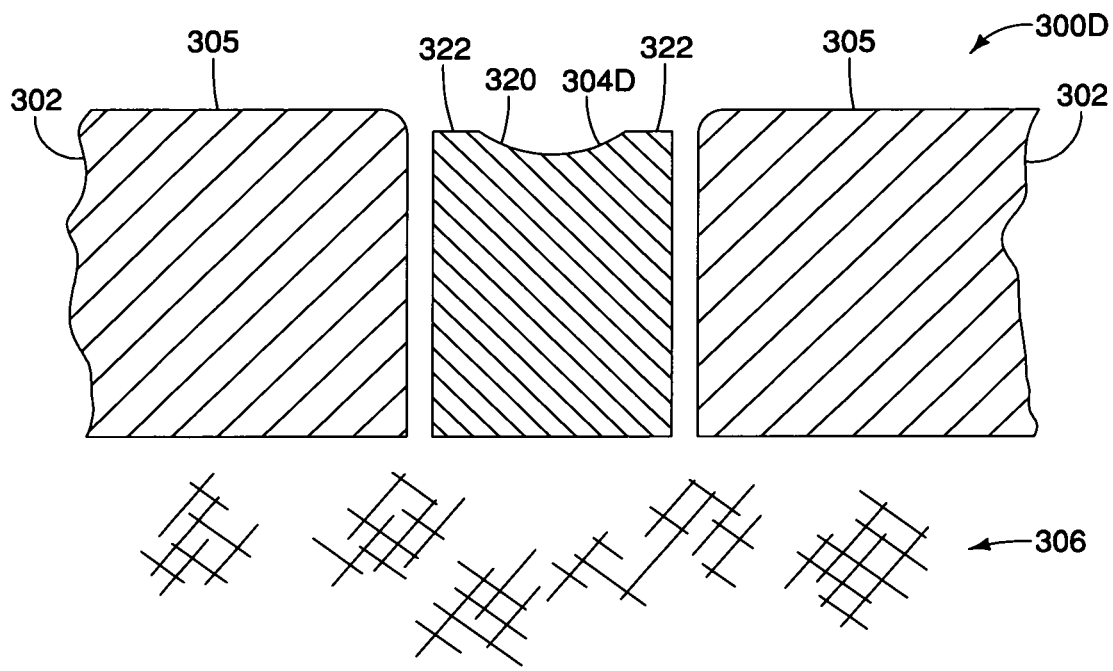
FIG. 9 is partial side sectional view depicting another variation of the surface covering system of FIG. 5.

FIG. 9 is a partial side sectional view of a surface covering system 300D, which is similar to the surface covering system 300 depicted in FIG. 5. However, in FIG. 9 the upper surface (not numbered) of the permeable tile 304D includes a concave center section 320 which is bordered by generally flat sections 322. As depicted in FIG. 9, the generally flat sections 322 of the upper surface of the permeable tile 304D are located below the upper surfaces 305 of the generally impermeable surface covering 302. However, the generally flat sections 322 of the upper surface of the permeable tile 304D can also be aligned with the upper surfaces 305 of the generally impermeable surface covering 302. The benefit of providing the concave center section 320 in the upper surface of the permeable tile 304D is that the concave center section allows a certain amount of pooling of water to occur when the inflow-rate of water to the upper surface (not numbered) of the permeable tile 304D exceeds the rate at which water can pass through the permeable tile to the subgrade fill material 306. Further, the benefit of providing the generally flat sections 322 on the upper surface of the permeable tile 304D is to avoid a sharp corner at the outer edges (not numbered) of the upper surface (also not numbered), since sharp corners at the upper edges of the permeable tile 304D can potentially spall, thus presenting a rough edge. The arrangement presented in FIG. 9 is thus configured to allow for ease of movement of wheeled conveyances (such as wheelchairs and the like) over the upper surfaces of the generally impermeable surface covering 302 and the permeable tile 304D. Preferably the permeable tile 304D is installed in such a manner that the generally flat sections 322 on the upper surface of the tile are recessed slightly below the upper surfaces (not numbered) of the impermeable surface covering 302. This arrangement provides a residence pooling capacity for storm water (or other liquids) consisting of a geometric pooling volume (the volume of the concave section 320 below the generally flat sections 322) and an inset pooling volume (the volume below the upper surfaces of the impermeable surface covering, and excluding the geometric volume).

It will also be appreciated an additional benefit is derived by installing the permeable tiles 304 (and variations thereof, as presented above) in a manner which permits removal of the permeable tiles without compromising the integrity of the adjacent generally impermeable surface covering 302. (That is, permeable tiles 304 can be easily removed by virtue of the gap 310 (FIG. 5) when the gap is filled with a material which does not bond the permeable tile 304 to the generally impermeable surface covering 302). The aforementioned benefit is that, should the permeable tile 304 lose permeability due to influx of solids, then the permeable tile 304 can be easily removed and replaced with a new permeable tile (or cleaned and reinstalled).

Figure 10:
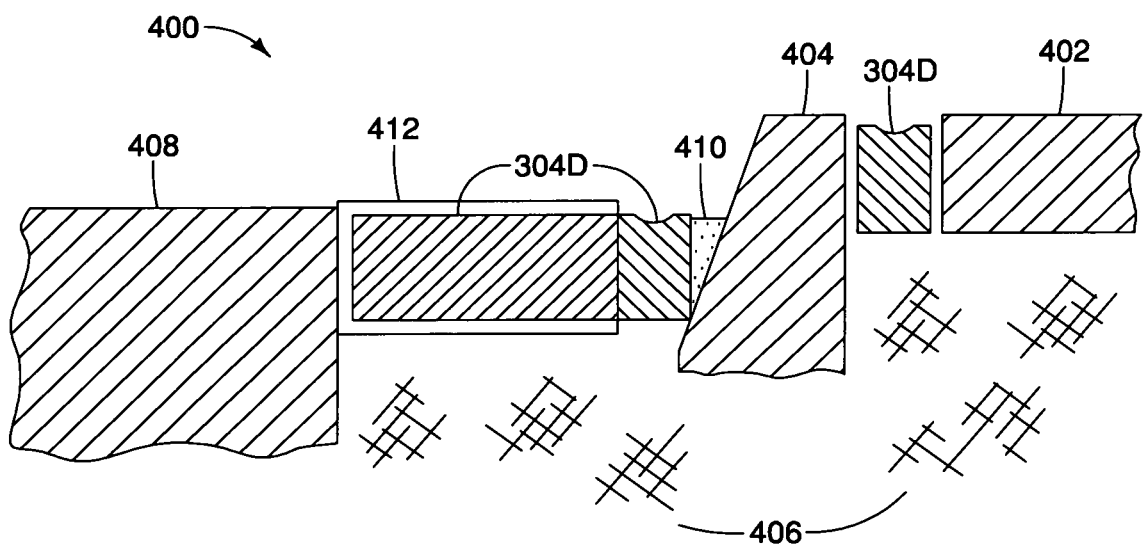
FIG. 10 is a partial side sectional view depicting another surface covering system that includes permeable tiles inserted in and through a generally impermeable surface covering.
Figure 11:
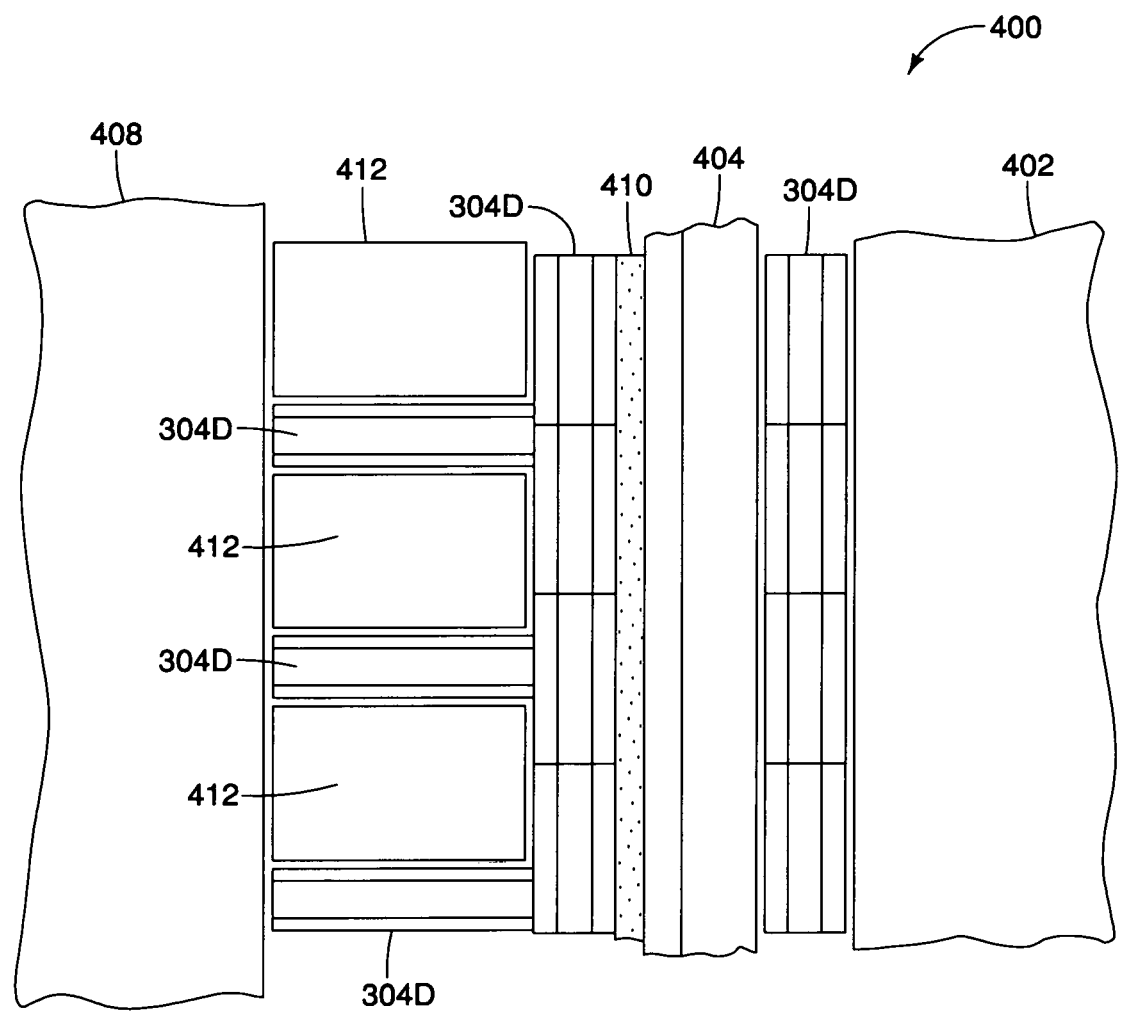
FIG. 11 is a partial plan view of the surface covering system depicted in FIG. 10.

FIG. 10 is a partial side sectional view of yet another surface covering system 400. The surface covering system 400 is particularly useful in urban settings to remove runoff water (such as storm water) from sidewalks and streets and to direct the water into a subgrade fill (versus the water flowing into a storm drain or the like). FIG. 11 is a plan view of the partial section depicted in FIG. 10. FIGS. 10 and 11 will be discussed together. In the system 400 a row of permeable tiles 304D (as described above with respect to FIG. 9) is placed at one side of a generally impermeable sidewalk surface 402. Another row of the permeable tiles 304D can be placed at the other side (not shown) of the sidewalk 402, and permeable tiles can also be inserted through the sidewalk between the distal sides thereof. Also, two rows of the permeable tiles 304D can be placed adjacent to one another at the edge of the sidewalk 402. The number of rows of permeable tiles 304D to be used to drain water from the sidewalk 402 can be calculated based on anticipated rainfall amounts (in inches per hour), and drainage rate of the tiles 304D, and the surface area of the sidewalk. The row of permeable tiles 304D can be located between the edge of the sidewalk 402 and a curbing 404. To the left of the curbing (in FIGS. 10 and 11) is a street surface 408, which is also generally impermeable. Another row of impermeable tiles 304D is placed adjacent to the curb 404, and a fill material 410 (similar to fill material 312 of FIG. 6, described above) can be packed between the curbing 404 and the row of tiles 304D adjacent the curbing. The fill material 410 can be sand or the like, and is intended to become generally impermeable over a short period of time. This will reduce the migration of fines into the permeable subgrade material 406. The fine porosity of the permeable tiles 304D will prevent particles which can reduce permeability of the subgrade material 406 from migrating into the subgrade material via the tiles 304D. As with the permeable tiles placed adjacent to the sidewalk 402, a second row of permeable tiles can be placed adjacent to the curbing 404 on the street-side of the system 400. However, since vehicles may travel and park adjacent to the curbing 404, it is desirable to avoid having the wheel loads of vehicles rest directly on the permeable tiles 304D. Accordingly, as depicted in FIG. 11, a second set of permeable tiles 304D can be intermittently and orthogonally placed adjacent to the street-side row of permeable tiles 304D. As can be seen in FIG. 11, the orthogonally oriented permeable tiles 304D are placed between generally impermeable paver tiles 412. The paver tiles 412 can have high compressive strength to resist vehicle wheel loads. Also, as depicted in FIG. 10, the orthogonally oriented permeable tiles 304D can be placed slightly below the paver tiles 412 (in the manner indicated in FIG. 9). In this way vehicles tires will tend to be supported by the paver tiles 412, thus avoiding the imposition of significant loads on the permeable tiles 304D that are placed between the street surface 408 and the curbing 404. The width of the permeable tiles 304D can be about 4 cm or less, such that vehicle tires (which typically have widths greater than about 12 cm) are generally suspended above the permeable tiles that are immediately adjacent to the curbing 404. While not shown in FIGS. 10 and 11, another row of permeable tiles can be inserted into the street surface 408 as a centerline, which can assist in removing water from the street surface.

Water extraction covering over a low permeability surface covering. It has now become a common practice to replace asphalt road surface coverings at high-traffic intersections with a concrete road surface covering. A concrete road surface covering is much more resistant than is asphalt to the high level of braking and acceleration forces imposed upon the road at such high-traffic intersections. However, a concrete road surface is generally impermeable to water, and thus presents the opportunity for a surface layer of water to accumulate upon the concrete road surface, thus reducing stopping and accelerating capabilities for vehicles. Even with proper grading to promote migration of water from the concrete road surface there can still be a sheet of water moving across the concrete road surface which inhibits braking and acceleration of vehicles. Accordingly, one use of the permeable unitized construction materials of the present disclosure is to apply a layer of the permeable unitized construction materials of the present disclosure over the upper surface of a concrete road surface at high-traffic intersections. By proper grading of the intersection, water passing through the permeable unitized construction materials of the present disclosure can be channeled from the underlying concrete road surface into water drainage channels. Further, the overlying permeable unitized construction materials can be provided with a selected degree of roughness to facilitate braking and acceleration of vehicles thereon.

Third Embodiment: Recovery of Metals from Kilning of Mineral Based Materials

I have also discovered that the kilning of mineral-based components (such as micaceous-based and arkose-based rock) to produce the porous mineral-based granular materials provided for herein-above, and the kilning of sublimation-agent containing materials to form the unitized formed construction materials provided for herein-above, results in the evolution of mineral-containing gasses which can be subsequently processed in order to recover the mineral content of such mineral-containing gasses, as provided for more fully below.

Recovery of metals from kilning of micaceous-based and arkose-based rock. When micaceous-based and arkose-based rock is kilned at a temperature of between about 1000° C. and about 1250° C. (about 1830-2280° F.), the kilning will result in the evolution (by sublimation and/or vaporization) of metal sulfides (such as zinc sulfide and iron sulfide) in a gaseous form. The gaseous form of these evolved metal sulfides can be collected and condensed into a solid form, and subsequently processed (by known means for separating metallic elements from sulfur) in order to extract the mineral content from the condensed gasses evolved during kilning of the arkose-based rock. (A similar metal recovery process can be used when manufactured mineral materials are used as the starting material for the porous mineral-based granular materials provided for herein-above.)

Recovery of metals from kilning of starting materials for unitized construction materials as provided for herein. When the starting materials for a unitized construction material (as provided for herein-above) are kilned, the kilning process will generate gaseous metallic components which include a significant gaseous portion of the sublimation agent (as described above), and/or gaseous metallic components released by the sublimation agent. These gaseous metallic components can be collected and condensed, and subsequently processed (using known methods for separating metallic components from metallic sulfides and metallic oxides) in order to recover metallic components, and in particular the metallic components of the sublimation agent and metallic components of the aggregate. Accordingly, a large portion (e.g., 50% or more) of the evolved metallic components can be recovered. These recovered metallic components can then be used in other industrial processes.

Method for recovering metals generated by kilning of mineral-based and mineral-containing material. As described above, mineral containing gasses are evolved (either via sublimation and/or vaporization) when mineral-based and/or mineral-containing materials are kilned at a temperature of between about 1200° C. and about 1300° C. (about 2200-2400° F.). A method for recovering metals generated by kilning of mineral-based and/or mineral-containing materials at a temperature of between about 1200° C. and about 1300° C. thus includes the following steps: (i)

placing a starting material comprising a mineral-based and/or a mineral-containing material into a kiln (e.g., as sand or as a solidified precursor unit for a unitized formed construction material, as described above): (ii) heating the starting material in the kiln to a temperature of between about 1200° C. and about 1300° C.; (iii) recovering and condensing metallic-containing gasses evolved from the starting material in order to obtain condensed metallic compounds evolved from the starting material; and (iv) processing the condensed metallic compounds evolved from the starting material in order to extract the metallic content therefrom.

Use of relative terminology in the above description. The use of relative terminology in the above disclosure (e.g., the use of terms such as "about", "essentially", "substantially", etc., as used herein above) are to be interpreted in light of the desired objectives to be accomplished (as recited herein). For example, the above-recited sintering temperatures, sublimation temperatures, sintering times, sublimation times, and percentages of material composition can all be varied (as described above) in order to achieve the recited levels of sublimation and/or sintering in order to achieve the desired levels of porosity and/or sintering for the desired end product of either mineral-based porous granular materials and/or mineral-based construction materials. While not specifically limiting any of the above-described time, temperature and/or composition limitations, it is generally considered that any relative term used herein will constitute a practical limit beyond which the recited objectives will not be achieved. For example, for a recited lower temperature range of "about" 1200° C., that would include a lower temperature as low as 3% of 1200° C. (which is 40° C.), and thus a lower temperature of 1160° C. is considered to be in the range of "about" 1200° C. More specifically: (i) when referring to preferred temperatures recited herein, relative terminology is intended to mean temperatures within 3% of the recited quantity; (ii) when referring to preferred times recited herein, relative terminology is intended to mean times within 10% of the recited quantity; and (iii) when referring to preferred compositions of matter recited herein, relative terminology is intended to mean compositions of matter within 15% of the recited quantity (or quantities). However, these indicated limitations are not to be considered as strict limitations, and it is the end-objective for any article of manufacture, or methods for making such articles of manufacture, as provided for herein, that are to be considered as limitations on recited quantities, all as within the scope of the concept of equivalents and the current disclosure. As also described above, various combinations of the starting materials can be used in manufacturing the desired end products (and in particular, combinations of different kinds of aggregate, and different kinds of sublimation agents (for the unitized construction materials), and thus the kilning temperatures and kilning times can include respective overlapping ranges (as well as their allowed variances) to thus result in an engineered finished product having preselected desired properties (and in particular, porosity, permeability and/or strength).

The preceding description has been presented only to illustrate and describe exemplary methods and apparatus of the present disclosure. It is not intended to be exhaustive or to limit the disclosure to any precise form disclosed. Many modifications and variations are possible in light of the above teachings. It is intended that the scope of one or more inventions provided for herein be defined at least by the following claims.

I claim:

1. A method for manufacturing a catalytic sieve, comprising:
  (a) providing starting materials comprising an aggregate, a cementing agent, a sublimation agent and water;
  the sublimation agent selected from the group consisting of molybdenum disulfide, tungsten disulfide, vanadium disulfide, copper sulfate, and combinations thereof;
  the sublimation agent being provided in an amount of between 25% and 50% by weight of the cementing agent;
  the aggregate containing at least 2% by weight of at least one transition metal;
  (b) mixing the starting materials with one another to achieve a mixture of the starting materials;
  (c) placing the mixture of the starting materials into a form;
  (d) curing the mixture of starting materials in the form for a period of time selected to allow the mixture of starting materials to become a solidified unit of the mixture of starting materials, the solidified unit of the mixture of starting materials being defined by a minimum dimension of thickness, length, and one of width or diameter;
  (e) placing the solidified unit of the mixture of starting materials into a kiln;
  (f) heating the kiln containing the solidified unit of the mixture of starting materials to a processing temperature of between 1115° C. and 1350° C. and maintaining the kiln at the processing temperature for a period of time of between 10 minutes and 60 minutes per centimeter of the minimum dimension of the consolidated unit of the mixture of starting materials; and
  (g) removing the solidified unit of the mixture of starting materials from the kiln, the solidified unit removed from the kiln being the catalytic sieve.

2. The method of claim 1 and further comprising:
  determining a quantity of metals within the aggregate, the cementing agent and the water which are available to chemically react at the processing temperature with the sublimation agent; and
  providing a selected amount of the sublimation agent in order to provide sufficient sublimation agent to chemically react at the processing temperature, and in a stoichiometric ratio, with the determined quantity of metals within the aggregate, the cementing agent and the water in order to render the determined quantity of metals non-reactive at temperatures below the processing temperature.

3. The method of claim 1 and wherein the aggregate comprises an arkose-based granular material.

4. The method of claim 3 and wherein the arkose-based granular material comprises a micaceous arkose rock material containing mica.

5. The method of claim 4 and wherein the mica is in the form of muscovite and includes more than 4% (by weight) of potassium.

6. The method of claim 4 and wherein the mica is in the form of paragonite and includes more than 4% (by weight) of sodium.

7. The method of claim 4 and wherein the arkose-based granular material comprises at least 30% by weight of quartz, at least 20% by weight of metallic compounds, and the mica is more than 25% by weight of the arkose-based granular material.

8. The method of claim 1 and wherein at least 50% by volume of the aggregate is defined by an aggregate particle size mean diameter of between 0.07 mm and 0.6 mm.

9. The method of claim 1 and wherein the cementing agent comprises less than 10% by weight of a total mass of the starting materials.

10. The method of claim 1 and wherein the processing temperature is between 1100° C. and 1150° C.

11. The method of claim 1 and further comprising, subsequent to step (e) of placing the consolidated unit of the mixture of starting materials into the kiln, and prior to step (f) of heating the kiln containing the solidified unit of the mixture of starting materials to the processing temperature, the step of maintaining the kiln at a drying temperature of between 80° C. and 100° C. for a period of time selected to vaporize at least 80% by volume of any entrained water from the solidified starting materials.

12. The method of claim 1 and wherein the aggregate comprises 50% or more by weight of mine tailings.

13. The method of claim 1 and further comprising adding to the starting materials a metal oxide selected to act as a catalytic agent.

14. The method of claim 13 and wherein the metal oxide comprises at least 5% by weight of the starting materials.

15. The method of claim 1 and further comprising adding to the starting materials a alkali metal selected to act as a catalytic agent.

16. The method of claim 15 and wherein the metal alkali comprises at least 5% by weight of the starting materials.

17. A catalytic sieve manufactured according to the method of claim 1.

* * * * *